US012442578B2

(12) United States Patent
McCollough et al.

(10) Patent No.: US 12,442,578 B2
(45) Date of Patent: Oct. 14, 2025

(54) REFRIGERATOR APPLIANCE ICE STORAGE BIN RETENTION

(71) Applicant: Electrolux Home Products, Inc., Charlotte, NC (US)

(72) Inventors: Thomas McCollough, Anderson, SC (US); Eduardo Nicolas Orthmann Da Silva, Curitiba (BR); Rodrigo Marge Pagnozzi, Curitiba (BR); Lokesha Kodigenahalli Chinnappa Reddy, Louisville, KY (US); Eduardo Henrique Sare, Curitiba (BR)

(73) Assignee: Electrolux Consumer Products, Inc., Charlottle, NC (US)

( * ) Notice: Subject to any disclaimer, the term of this patent is extended or adjusted under 35 U.S.C. 154(b) by 192 days.

(21) Appl. No.: 17/918,379

(22) PCT Filed: May 20, 2020

(86) PCT No.: PCT/US2020/033687

§ 371 (c)(1),
(2) Date: Oct. 12, 2022

(87) PCT Pub. No.: WO2021/236072

PCT Pub. Date: Nov. 25, 2021

(65) Prior Publication Data

US 2023/0194138 A1 Jun. 22, 2023

(51) Int. Cl.
*F25C 5/182* (2018.01)
*F16B 5/06* (2006.01)
(Continued)

(52) U.S. Cl.
CPC ............ *F25C 5/182* (2013.01); *F16B 5/0664* (2013.01); *F25C 5/22* (2018.01); *F25C 1/04* (2013.01); *F25C 2400/10* (2013.01)

(58) Field of Classification Search
CPC .... F25C 5/182; F25C 5/22; F25C 1/04; F25C 2400/10; F25C 5/185; F25C 5/24;
(Continued)

(56) References Cited

U.S. PATENT DOCUMENTS

| | | |
|---|---|---|
| 5,272,888 A | 12/1993 | Fisher et al. |
| 6,952,936 B2 | 10/2005 | Sannasi et al. |

(Continued)

FOREIGN PATENT DOCUMENTS

| | | |
|---|---|---|
| EP | 2843326 | 3/2015 |
| EP | 3048393 | 7/2016 |

(Continued)

OTHER PUBLICATIONS

EP 2843326 A2 Translation (Year: 2015).*
International Search Report for PCT/US2020/033687, dated Feb. 18, 2021, 2 pages.

*Primary Examiner* — Elizabeth J Martin
*Assistant Examiner* — Dario Antonio Deleon
(74) *Attorney, Agent, or Firm* — Chrisman Gallo Tochtrop LLC

(57) ABSTRACT

A refrigeration appliance includes an ice maker for freezing water into ice pieces. The ice maker (125) includes an ice maker housing (126), an ice making unit (156) for making the ice pieces, a removeable ice bin (135) receiving the ice pieces, and an ice dispenser having a rotatable auger (170) that drives the ice pieces out of the removable ice bin to a bin aperture (168) at the ice bin via a driving force applied in a first direction. A latching assembly is provided at least partially at each of the removeable ice bin and the ice maker housing, and is configured to apply a resisting force to the ice bin at least along a second direction opposite the first direction. The removable ice bin is selectively removable from the ice maker housing by the user applying a removal
(Continued)

force greater than the driving force to the ice bin in the first direction.

21 Claims, 16 Drawing Sheets

(51) Int. Cl.
*F25C 1/04* (2018.01)
*F25C 5/20* (2018.01)

(58) Field of Classification Search
CPC .......... F25C 1/24; F25C 5/187; F16B 5/0664; F25D 23/12
See application file for complete search history.

(56) References Cited

U.S. PATENT DOCUMENTS

| | | | | |
|---|---|---|---|---|
| 7,594,413 | B2 | 9/2009 | Martin et al. | |
| 7,726,148 | B2 | 6/2010 | Martin et al. | |
| 7,806,491 | B2 | 10/2010 | Lee et al. | |
| 7,870,754 | B2 | 1/2011 | Martin et al. | |
| 7,963,120 | B2 | 6/2011 | An et al. | |
| 8,047,622 | B2 | 11/2011 | Lee et al. | |
| 8,474,283 | B2 | 7/2013 | Kim | |
| 8,640,488 | B2 | 2/2014 | Shaha et al. | |
| 8,794,024 | B2 | 8/2014 | Martin et al. | |
| 8,973,392 | B2 | 3/2015 | Jeong et al. | |
| 9,103,577 | B2 | 8/2015 | Hwang | |
| 9,207,008 | B2 | 12/2015 | Martin et al. | |
| 9,395,114 | B2 | 7/2016 | Martin et al. | |
| 9,568,234 | B2 | 2/2017 | Jeong et al. | |
| 2013/0192279 | A1* | 8/2013 | Bertolini et al. | F25C 1/12 62/66 |
| 2013/0263621 | A1* | 10/2013 | An et al. | F25C 5/22 62/344 |
| 2016/0116199 | A1* | 4/2016 | Fischer et al. | F25C 5/22 62/344 |
| 2019/0331386 | A1* | 10/2019 | Yang | F25C 1/24 |
| 2021/0318051 | A1* | 10/2021 | Mitchell | F25C 1/243 |

FOREIGN PATENT DOCUMENTS

| | | | | |
|---|---|---|---|---|
| EP | 3150946 | | 4/2017 | |
| KR | 2843326 | A2 * | 3/2015 | F25C 5/182 |

* cited by examiner

REFRIGERATOR APPLIANCE ICE STORAGE BIN RETENTION

FIELD OF THE INVENTION

This application relates generally to an ice maker for a refrigeration appliance, and more particularly, to a refrigeration appliance including an ice maker disposed within a food-storage compartment of a refrigerator and including an ice bin for storing ice, which bin is retained in an ice maker housing.

BACKGROUND OF THE INVENTION

Conventional refrigeration appliances, such as domestic refrigerators, typically have both a fresh food compartment and a freezer compartment or section. The fresh food compartment is where food items such as fruits, vegetables, and beverages are stored. The freezer compartment is where food items that are to be kept in a frozen condition are stored. The refrigerators are provided with refrigeration systems that maintains the fresh food compartment at temperatures above 0° C., such as between 0.25° C. and 4.5° C. and the freezer compartments at temperatures below 0° C., such as between 0° C. and −20° C.

The arrangements of the fresh food and freezer compartments with respect to one another in such refrigerators vary. For example, in some cases, the freezer compartment is located above the fresh food compartment and in other cases the freezer compartment is located below the fresh food compartment. Additionally, many modern refrigerators have their freezer compartments and fresh food compartments arranged in a side-by-side relationship. Whatever arrangement of the freezer compartment and the fresh food compartment is employed, typically, separate access doors are provided for the compartments so that either compartment can be accessed without exposing the other compartment to the ambient air.

Such conventional refrigerators are often provided with an ice maker having a unit for making ice pieces, commonly referred to as "ice cubes" despite the non-cubical shape of many such ice pieces. These ice making units normally are located in the freezer compartments of the refrigerators and manufacture ice by convection, i.e., by circulating cold air over water in an ice tray to freeze the water into ice cubes. Or, alternatively, the ice making unit can be located in the fresh food compartment with the unit having cold air, such as directly from the freezer compartment circulated over water in a respective ice tray.

Storage bins for storing the frozen ice pieces are also often provided adjacent to the ice making units. Typically, such ice making unit includes such ice bin that is machined/manufactured to accept a certain, nonadjustable volume of ice pieces. A spring hinge or the like can be used by the ice making unit to detect a volume of ice cubes within the ice bin in order to inhibit the ice maker from making more ice cubes than can be contained by the ice bin.

The ice bin also is typically machined/manufactured to accept an auger of an ice dispenser. The auger may force ice cubes stored in the ice bin to the ice dispenser when the user makes a request for ice cubes via the ice dispenser. The ice pieces can be dispensed from the storage bins through a dispensing port in the door that closes the respective storage compartment to the ambient air.

BRIEF SUMMARY OF THE INVENTION

A refrigeration appliance includes an ice maker for freezing water into ice pieces. The ice maker includes an ice maker housing, an ice making unit for making the ice pieces, a removeable ice bin receiving the ice pieces, and an ice dispenser having a rotatable auger that drives the ice pieces out of the removable ice bin to a bin aperture at the ice bin via a driving force applied in a first direction. A latching assembly is provided at least partially at each of the removeable ice bin and the ice maker housing, and is configured to apply a resisting force to the ice bin at least along a second direction opposite the first direction. The removable ice bin is selectively removable from the ice maker housing by the user applying a removal force greater than the driving force to the ice bin in the first direction.

According to one aspect, a refrigeration appliance comprises at least one of a fresh food compartment for storing food items in a refrigerated environment having a target temperature above zero degrees Centigrade or a freezer compartment for storing food items in a sub-freezing environment having a target temperature below zero degrees Centigrade, and an ice maker disposed within the fresh food compartment or the freezer compartment for freezing water into ice pieces. The ice maker comprises an ice maker housing and a removable ice bin for storing the ice pieces produced by an ice making unit within the ice maker housing. A rotatable auger is positioned within the ice bin and is configured to drive the ice pieces out of the ice bin via a driving force applied in a first direction. A latch assembly has a pair of angled mating elements configured to engage one another along at least one linearly extending mating line to apply a resisting force to the ice bin along a second direction generally opposed to the first direction, the resisting force being sufficient to counter a portion of the driving force applied to the ice bin when the latch assembly is in a fully engaged orientation. A removal force applied by a user to remove the ice bin from the ice maker housing causes separation of the pair of angled mating elements relative to one another, said separation occurring in a direction transverse to each of the first direction and the second direction.

According to another aspect, a refrigeration appliance comprises a storage compartment for storing food items in a cooled environment, and an ice maker disposed within the storage compartment for freezing water into ice pieces. The ice maker comprises an ice maker housing having an internal cavity, an ice bin for storing the ice pieces produced by an ice making unit, the ice bin being linearly removable from the internal cavity along a longitudinal central axis of the internal cavity, and a latch assembly. The latch assembly is configured to aid in retaining the ice bin in the ice maker housing, the latch assembly including a tang that is flexible at its base, and a linearly extending receiver configured to deflect the tang out of a latched orientation thereof. Upon linear insertion or removal of the ice bin relative to the internal cavity, the receiver is configured to transfer a respective linear pushing force or linear pulling force of a user acting on the ice bin into a deflection of a distal end of the tang over the receiver, to thereby cause respective coupling or decoupling of the latch assembly.

According to still another aspect, an ice maker is arrangeable within a storage compartment of a refrigeration appliance, the ice maker for freezing water into ice pieces. The ice maker comprises an ice maker housing, an ice making apparatus disposed within the ice maker housing and configured to make the ice pieces, and an ice bin selectively receivable into and removable from the ice maker housing in a generally horizontal direction, One of the ice bin or the ice maker housing includes a longitudinally extending tang and the other of the ice bin and the ice maker includes a receiver engagement surface. The tang and the receiver engagement surface are selectively engageable with one another to restrict unintended withdrawal of the ice bin from the ice maker housing. The tang includes a pair of opposed tang angled surfaces and the receiver engagement surface includes a pair of opposed ridge angled surfaces, wherein the two tang angled surfaces of the tang extend transverse to one another and the two receiver angled surfaces of the receiver extend transverse to one another. The tang angled surfaces and the ridge angles surfaces are jointly configured to enable both sliding engagement and sliding removal of the tang and the receiver engagement surface relative to one another upon linear translation of the ice bin relative to the ice maker housing.

The foregoing and other features of the invention are hereinafter described in greater detail with reference to the accompanying drawings.

BRIEF DESCRIPTION OF THE DRAWINGS

The accompanying drawings, which are not necessarily to scale, show various aspects of the disclosure.

DETAILED DESCRIPTION

Figure 1:
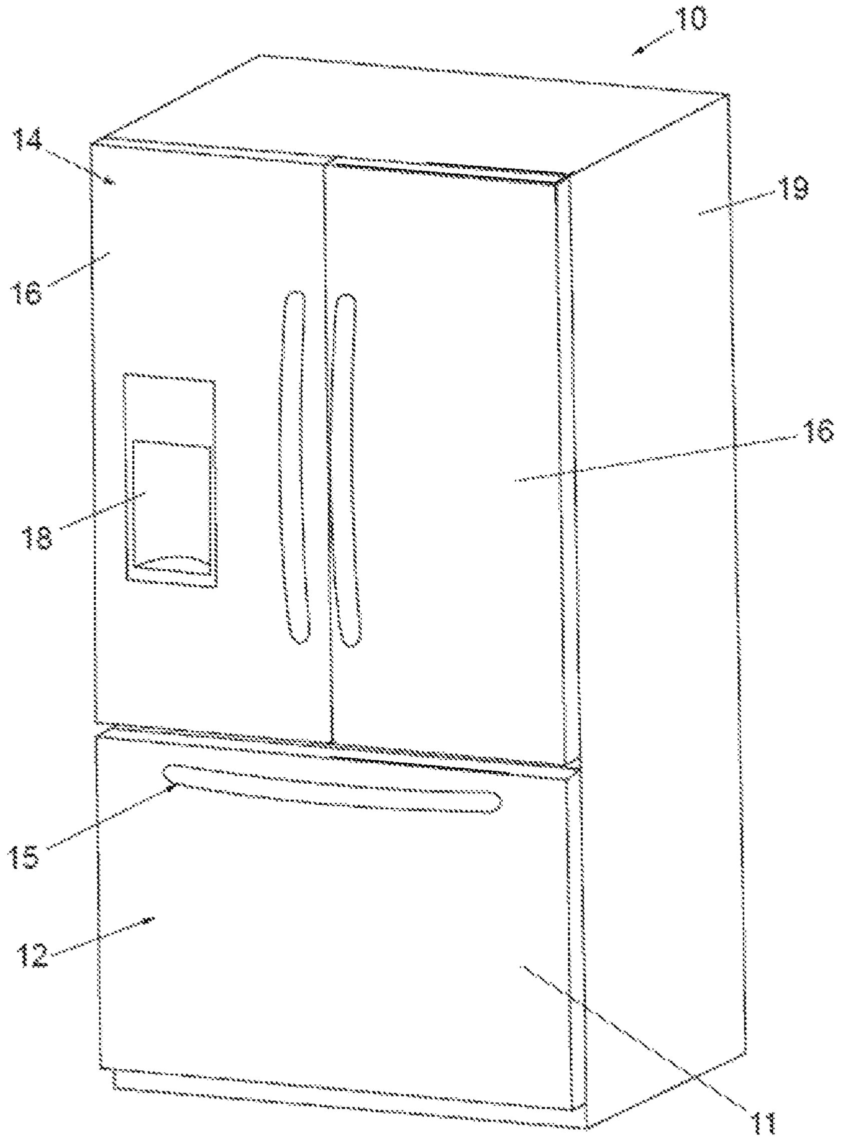
FIG. 1 (Prior Art)
FIG. 1 is a front perspective view of a household French Door Bottom Mount refrigerator of the prior art wherein doors of the refrigerator are in a closed position.

Embodiments of a refrigerator or a component thereof now will be described with reference to the accompanying drawings. Whenever possible, the same reference numerals are used throughout the drawings to refer to the same or like parts.

Referring now to the drawings, FIG. 1 shows a refrigeration appliance in the form of a domestic refrigerator, indicated generally at 10. Although the detailed description that follows concerns a domestic refrigerator 10, the invention can be embodied by refrigeration appliances other than with a domestic refrigerator 10. Further, an embodiment is described in detail below, and shown in the figures as a bottom-mount configuration of a refrigerator 10, including a fresh food compartment 14 disposed vertically above a freezer compartment 12. However, the refrigerator 10 can have any desired configuration including at least a fresh food compartment 14 and/or a freezer compartment 12, such as a top mount refrigerator (freezer disposed above the fresh food compartment), a side-by-side refrigerator (fresh food compartment is laterally next to the freezer compartment), a standalone refrigerator or freezer, etc.

One or more doors 16 shown in FIG. 1 are pivotably coupled to a cabinet 19 of the refrigerator 10 to restrict and grant access to the fresh food compartment 14. The door 16 can include a single door that spans the entire lateral distance across the entrance to the fresh food compartment 14, or can include a pair of French-type doors 16 as shown in FIG. 1 that collectively span the entire lateral distance of the entrance to the fresh food compartment 14 to enclose the fresh food compartment 14. For the latter configuration, a center flip mullion 21 (FIG. 2) is pivotally coupled to at least one of the doors 16 to establish a surface against which a seal provided to the other one of the doors 16 can seal the entrance to the fresh food compartment 14 at a location between opposing side surfaces 17 (FIG. 2) of the doors 16. The mullion 21 can be pivotably coupled to the door 16 to pivot between a first orientation that is substantially parallel to a planar surface of the door 16 when the door 16 is closed, and a different orientation when the door 16 is opened. The externally-exposed surface of the center mullion 21 is substantially parallel to the door 16 when the center mullion 21 is in the first orientation and forms an angle other than parallel relative to the door 16 when the center mullion 21 is in the second orientation. The seal and the externally-exposed surface of the mullion 21 cooperate approximately midway between the lateral sides of the fresh food compartment 14.

Figure 2:
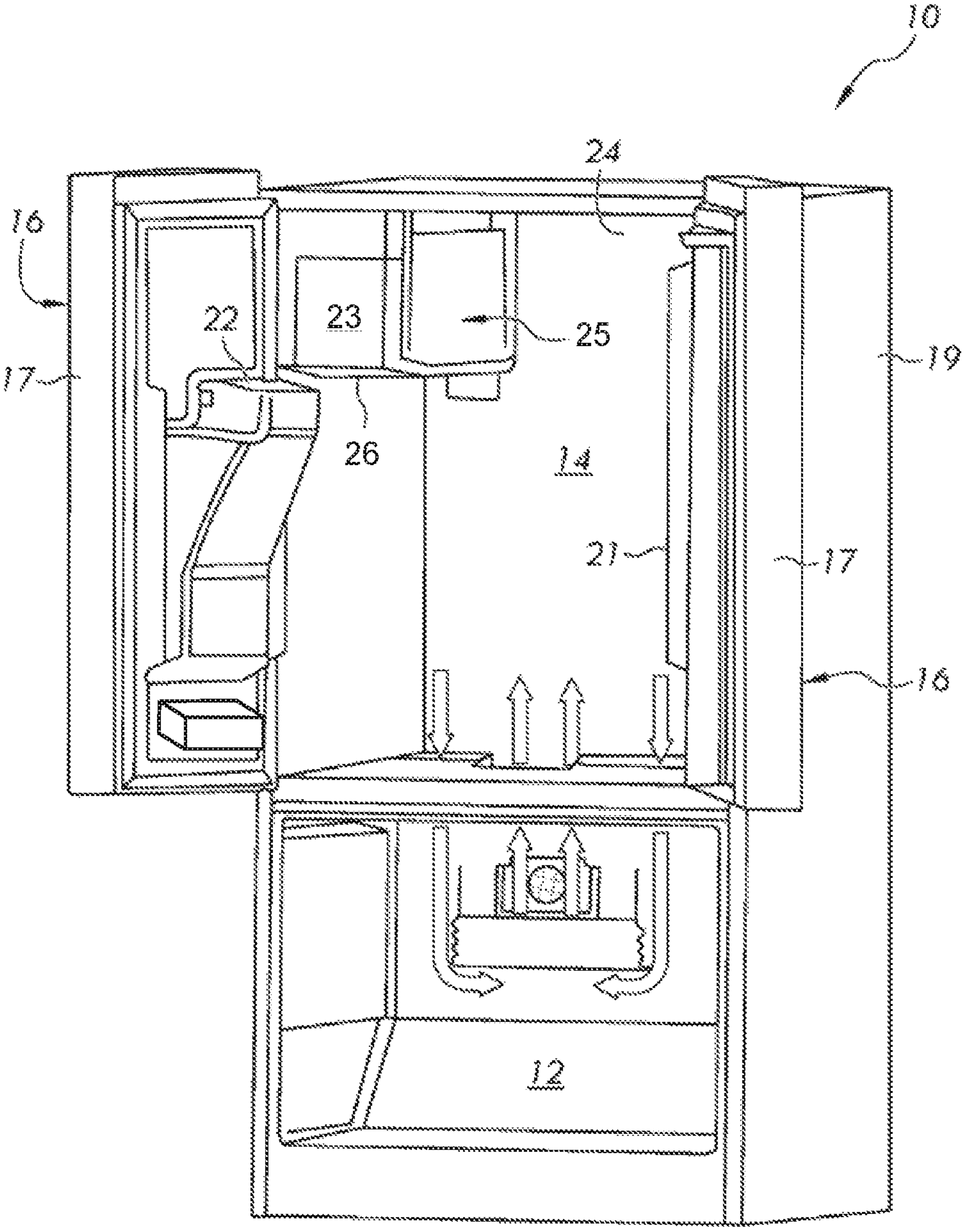
FIG. 2 (Prior Art)
FIG. 2 is a front perspective view of the refrigerator of FIG. 1 showing the doors in an opened position and an interior of a fresh food compartment.

Turning to both FIGS. 1 and 2, a dispenser 18 (FIG. 1) for dispensing at least ice pieces, and optionally water, can be provided on an exterior of one of the doors 16 that restricts access to the fresh food compartment 14. The dispenser 18 includes an actuator (e.g., lever, switch, proximity sensor, etc.) to cause frozen ice pieces to be dispensed from an ice bin 26 (FIG. 2) of an ice maker 25 disposed within the fresh food compartment 14. Ice pieces from the ice bin 26 can exit the ice bin 26 through an aperture 27 and be delivered to the dispenser 18 via an ice chute 22 (FIG. 2), which extends at least partially through the door 16 between the dispenser 18 and the ice bin 54.

The freezer compartment 12 is arranged vertically beneath the fresh food compartment 14. A drawer assembly (not shown) including one or more freezer baskets (not shown) can be withdrawn from the freezer compartment 12 to grant a user access to food items stored in the freezer compartment 12. The drawer assembly can be coupled to a freezer door 11 that includes a handle 15. When a user grasps the handle 15 and pulls the freezer door 11 open, at least one or more of the freezer baskets is caused to be at least partially withdrawn from the freezer compartment 12.

In alternative embodiments, the ice maker is located within the freezer compartment. In this configuration, although still disposed within the freezer compartment, at least the ice maker (and possible an ice bin) is mounted to an interior surface of the freezer door. It is contemplated that the ice mold and ice bin can be separate elements, in which one remains within the freezer compartment and the other is on the freezer door.

The freezer compartment 12 is used to freeze and/or maintain articles of food stored in the freezer compartment 12 in a frozen condition. For this purpose, the freezer compartment 12 is in thermal communication with a freezer evaporator (not shown) that removes thermal energy from the freezer compartment 12 to maintain the temperature therein at a temperature of 0° C. or less during operation of the refrigerator 10, preferably between 0° C. and −50° C., more preferably between 0° C. and −30° C. and even more preferably between 0° C. and −20° C.

The refrigerator 10 includes an interior liner 24 (FIG. 2) that defines the fresh food compartment 14. The fresh food compartment 14 is located in the upper portion of the refrigerator 10 in this example and serves to minimize spoiling of articles of food stored therein. The fresh food compartment 14 accomplishes this aim by maintaining the temperature in the fresh food compartment 14 at a cool temperature that is typically above 0° C., so as not to freeze the articles of food in the fresh food compartment 14. It is contemplated that the cool temperature preferably is between 0° C. and 10° C., more preferably between 0° C. and 5° C. and even more preferably between 0.25° C. and 4.5° C.

According to some embodiments, cool air from which thermal energy has been removed by the freezer evaporator can also be blown into the fresh food compartment 14 to maintain the temperature therein greater than 0° C. preferably between 0° C. and 10° C., more preferably between 0° C. and 5° C. and even more preferably between 0.25° C. and 4.5° C. For alternate embodiments, a separate fresh food evaporator can optionally be dedicated to separately maintaining the temperature within the fresh food compartment 14 independent of the freezer compartment 12.

According to an embodiment, the temperature in the fresh food compartment 14 can be maintained at a cool temperature within a close tolerance of a range between 0° C. and 4.5° C., including any subranges and any individual temperatures falling with that range. For example, other embodiments can optionally maintain the cool temperature within the fresh food compartment 14 within a reasonably close tolerance of a temperature between 0.25° C. and 4° C.

Figure 3:
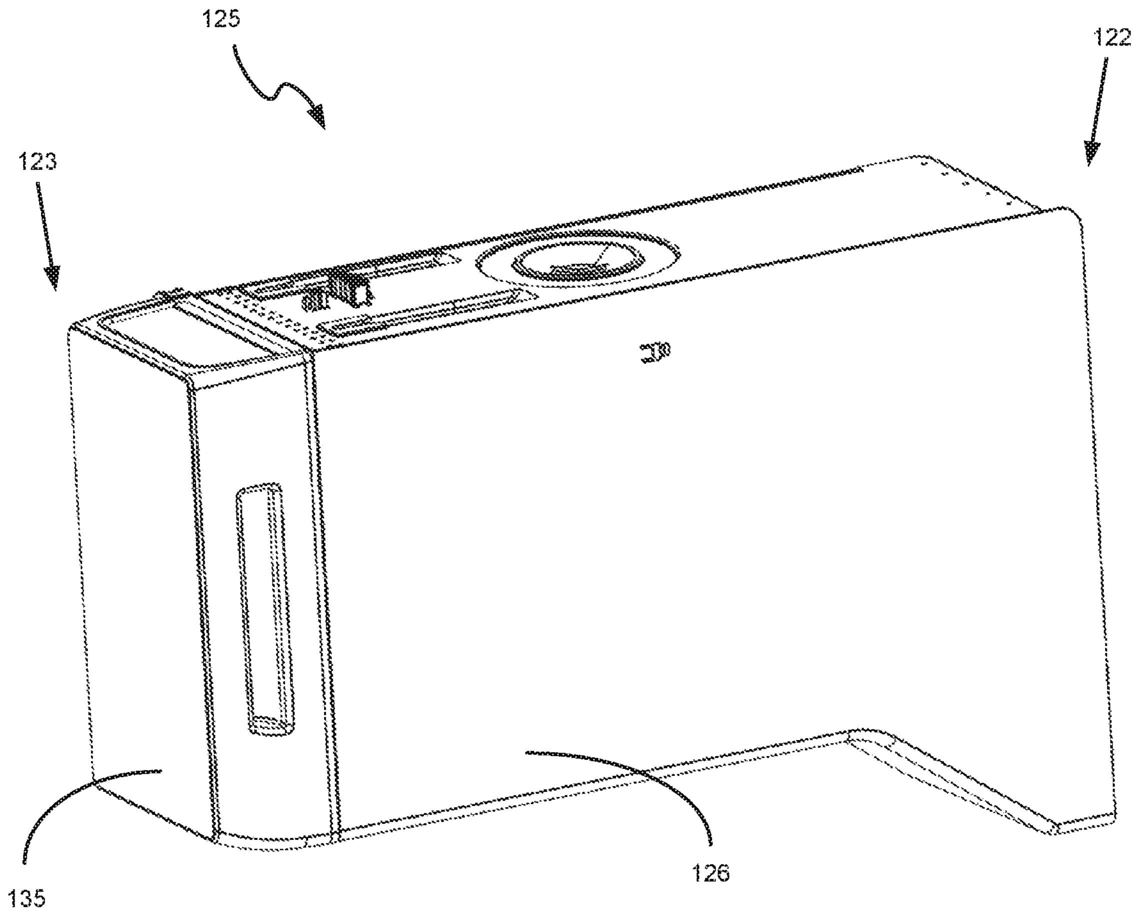
FIG. 3 is a perspective view of an example ice maker for use in a refrigeration appliance such as the refrigerator of FIG. 1.
Figure 4:
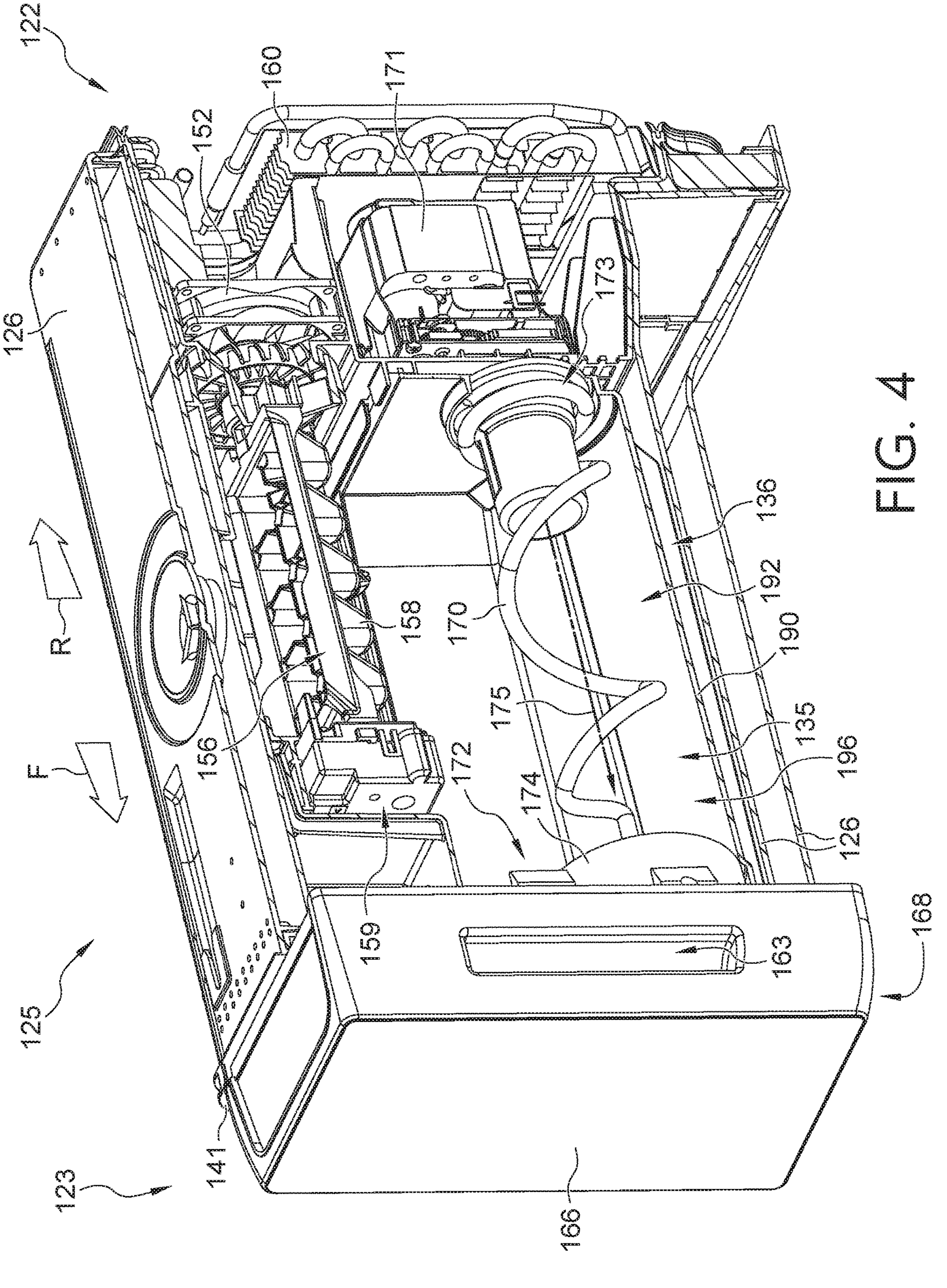
FIG. 4 is a perspective, partial-sectional view of the example ice maker of FIG. 3.

Turning now to FIGS. 3 and 4, another example ice maker 125 is illustrated, which can be used with a suitable refrigeration appliance, such as the refrigerator 10 previously described, where the ice maker 125 would be located in the upper fresh food compartment 14. In other embodiments, the ice maker 125 can be configured for use in a freezer compartment of a refrigeration appliance, or in a compartment capable of selectively providing any of a freezer temperature, a fresh food temperature, or any suitable temperature therebetween. A suitable refrigeration appliance including the ice maker 125 can have any suitable configurations of doors, drawers and/or compartments, and also can have any combination of one or more of a fresh food compartment, a freezer compartment, and a selective temperature compartment. Although the ice maker 125 will be discussed separately from any particular refrigeration appliance, it is appreciated that aspects of the ice maker 125 can be incorporated into the aforementioned ice maker 25.

FIG. 4 is a perspective, partial-sectional view of the ice maker 125 with at least part of an ice maker housing 126 removed to show internal details. As illustrated at FIG. 4, the ice maker 125 includes the ice maker housing 126 supporting and at least partially retaining an ice making unit 156 in an internal cavity 136 defined by the ice maker housing 126, an ice dispenser 132, and a removeable ice bin 135.

Turning first to the ice maker housing 126, the housing 126 is provided for maintaining thermal insulation between the respective storage compartment and the internal cavity 136 of the ice maker 125. The housing extends between a rear 122 and a front 123 of the ice maker 125. The housing 126 can be secured within the respective compartment using any suitable fastener. The housing 126 can be fully removable, fully non-removable, or can include both removable and non-removable aspects. For example, at least a side cover portion of the housing 126 facing into the respective storage compartment can be selectively removable to allow for access and/or service to inner components of the ice maker 125.

Figure 5:
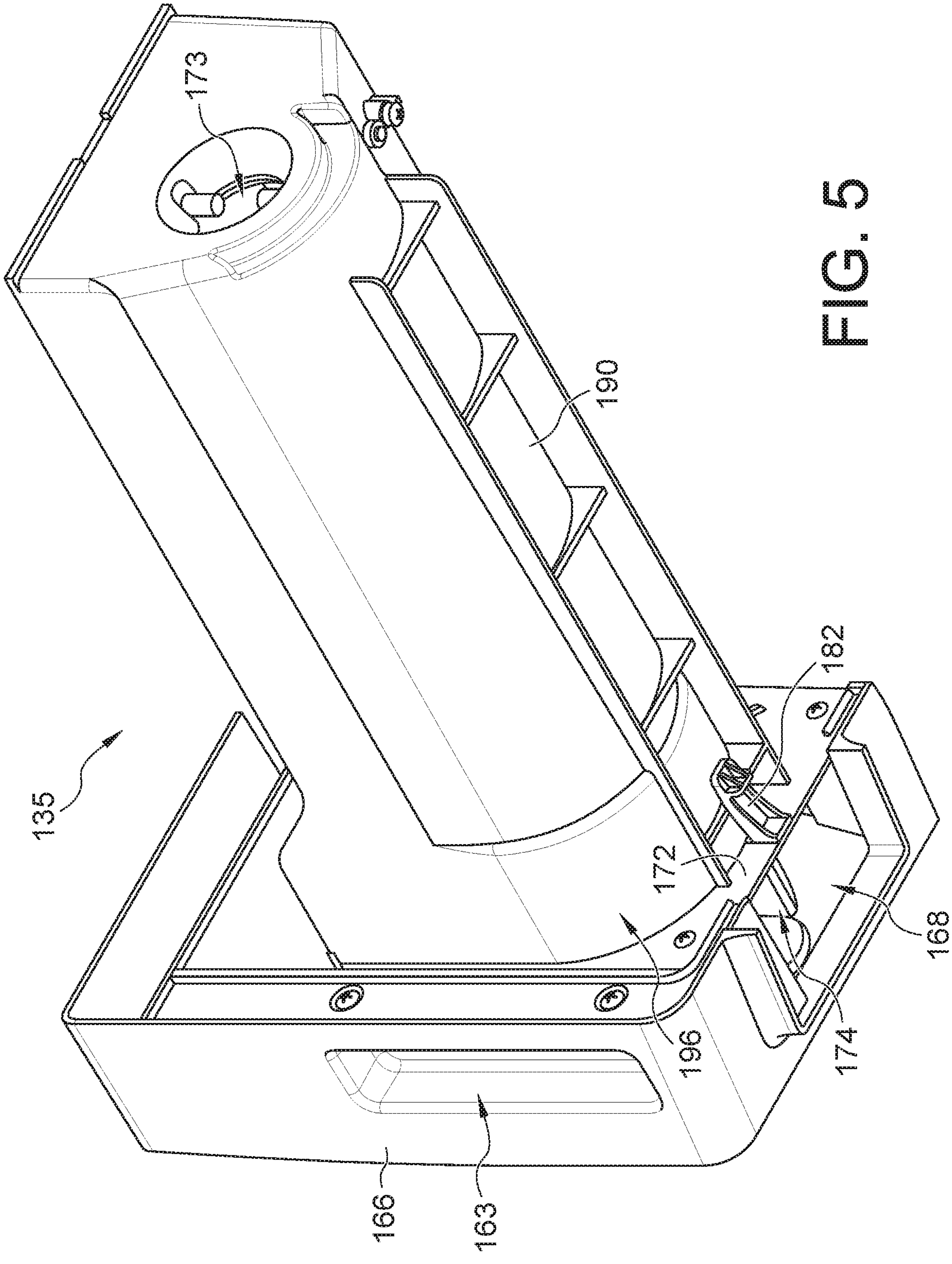
FIG. 5 is a perspective view of a front of an ice maker housing of the ice maker of FIG. 3, with the ice bin removed from the ice maker housing.

As shown at FIGS. 3-5, the ice maker housing 126 is generally-box shaped with a rectangular cross-section. According to alternate embodiments, the ice maker housing 126 can have any suitable shape.

An opening 140 is provided at the front 123 of the ice maker 125, particularly at a front end 141 of the ice maker housing 126. The opening 140 is in communication with the internal cavity 136 and is configured to face the respective opening of the storage compartment being selectively closed by a suitable door or drawer. The opening 140 and internal cavity 136 are configured, such as being shaped, to receive the ice bin 135.

Within the internal cavity 136, FIG. 4 illustrates an embodiment of an ice making unit 156 for freezing water into the ice pieces. The ice making unit 156 is shown supported adjacent to a ceiling of the ice maker housing 126 within the internal cavity 136. The ice making unit 156 includes a water tray 158 or mold for storing water to be frozen into the ice pieces. In one example, the ice making unit 156 can comprise a twist-tray type, in which the water tray 158 is rotated upside down and twisted along its longitudinal axis to thereby break the frozen ice pieces free from respective ice reservoirs of the water tray 158 such that the pieces fall into the removeable ice bin 135 located below the water tray 158. Additionally or alternatively, a conventional water tray with a plurality of sweeper-arms and a harvest heater for partially melting the ice pieces, or even other types of ice maker assemblies like a finger-evaporator type, could be utilized.

The ice making unit 156 further can include a bail arm (not specifically shown) for sensing the presence of ice pieces within the ice bin 135, and a driver 159, which includes an electric motor, for example, for driving the water tray 158 between an ice-making position and an ice-harvesting or ice-dumping position. A thermistor or other suitable temperature sensor (also not shown) can be operatively connected to a controller (not shown) of the ice making unit 156, or to any controller of the respective refrigeration appliance can be coupled to the water tray 158. Such thermistor or sensor can be embedded within a recess formed in the water tray 158, for determining the freezing status of the water contained in the water tray 518 to facilitate ice harvesting. One or more switches can also be provided communicatively coupled to the controller to determine when the water tray 158 has reached a travel limit. The bail arm can actuate a switch to signify an upper limit and/or absence of ice pieces in the ice bin 135.

Also within the internal cavity 136, an air mover 152 is disposed adjacent both the ice making unit 156 and an ice maker evaporator 160, for moving cooled air in a direction from the evaporator 160 to the water tray 158. The ice maker evaporator 160 is disposed at the rear 122 of the ice maker 125, opposite the opening 140, for freezing water into ice pieces and for maintaining a temperature in the ice bin 135. When the ice maker 125 is arranged in a compartment of a refrigerator, a system evaporator (not shown) of the respective refrigerator can be configured for removing thermal energy from air in the compartment and for reducing a temperature of the ice maker evaporator 160. When the ice maker 125 is arranged in a compartment of a freezer and exposed to a below-freezing environment, and/or is otherwise supplied with cold at a below-freezing temperature, it is to be appreciated that that any or all of the air mover 152 and ice maker evaporator 160 can be omitted.

Turning now to FIG. 5 along with FIG. 4, the ice bin 135 is selectively removable relative to the ice maker housing 126 to thereby grant access to ice pieces stored within the ice bin 135. The ice bin 135 includes a main body 190 that defines a bin cavity 192 for containing the ice pieces. A front wall 172 defines at least part of a front portion 196 of the bin cavity 192. The front wall 172 is illustrated as extending outward of and beyond the bin cavity 192 and mates with a cover 166. In other embodiments, outer peripheral portions of the front wall 172 could be replaced or supplemented by another wall or element integrated with one or both of the main body 190 or the cover 166.

This front cover 166 is located adjacent the front portion 196 and is configured to mate with the front end 141 of the ice maker housing 126 to provide a front closure/mating engagement for the ice maker 125. The front cover 166, front wall 172 and main body 190 are all suitably coupled to or formed integral with one another. A hand-hold 163 is disposed at a side of the front cover 166 to allow for gripping of the ice bin 135 to thereby remove the ice bin 135 from the internal cavity 136.

In an embodiment where the ice maker 125 is utilized in and installed in the refrigeration appliance 10 of FIGS. 1 and 2, a bin aperture 168 formed along a bottom surface of the cover 166 can be alignable with the ice chute 22 when the door 16 including the dispenser 18 is closed. This allows for frozen ice pieces stored within the ice bin 135 to be conveyed to the ice chute 22 and to be dispensed by the dispenser 18.

To cause the ice pieces in the bin 135 to be driven towards the front portion 196 of the bin cavity 192, the ice dispenser 132 includes a rotatable auger 170, drive motor 171 and rotating flap 174. The rotatable auger 170 is positioned within the bin cavity 192 and is configured to drive the ice pieces towards the aperture 168. The auger 170 can be automatically activated in response to a request for ice pieces initiated by the user, such as at the dispenser 18. The rotatable auger 170 is driven by the motor 171 or the like, either directly or indirectly through a transmission and via a removable mechanical coupling 173. The mechanical coupling 173 is coupled at a rear end of the main body 190 and permits removal of the ice bin 135 from the internal cavity 136 without removal of the motor 171. In one embodiment, the drive motor 171 can be configured to output a range of about 125 in-lbs. to about 185 in-lbs. of torque; in another embodiment, a range of about 150 in-lbs. to about 185 in-lbs. of torque; or in additional embodiments about 180 in-lbs. of torque or about 185 in-lbs. of torque.

Rotation of the auger 170 about a longitudinal central axis 175 by the motor 171 imparts a driving force F in a first direction into the ice pieces within the ice bin 135. This central axis 175 extends between the rear 122 (FIG. 4) and the front 123 (FIG. 4) of the ice maker 125. The rotation of the auger 170 drives the ice pieces towards the bin aperture 168, and also towards the rotating flap 174 engaged at a front end of the auger 170 adjacent the bin aperture 168. In the illustrated embodiment, the rotating flap 174 is at least partially disposed within an area defined within the cover 166. The rotating flap 174 is used to selectively force the discharged ice cubes into engagement with a plurality of rotating crusher blades that will break apart the cubes to enable dispensing of crushed ice. Alternatively, when whole ice cubes are desired, the rotating flap 174 will be moved out of the way so that the whole cubes can be readily discharged via the bin aperture 168. The driving force F acting on the ice pieces is provided in the first direction along or parallel to the longitudinal central axis 175.

To enable dispensing of a sufficient quantity of ice pieces, the auger 170 is driven at a speed to push the ice pieces forward to the bin aperture 168, which speed is slightly higher than a speed necessary to push the ice pieces through the aperture 168. In doing so, at least a portion of the driving force F is applied in the first direction against the front wall 172 (FIG. 4) adjacent the front portion 196 through the ice pieces being pushed thereagainst. The indirectly applied force F, along with any vibration created during dispensing, could cause movement of the ice bin 135 along the same direction as the force F, i.e., out of the internal cavity 136 along the central axis 175. This collateral vibration effect occurs mainly during dispensing of crushed ice (i.e., with the rotating flap 174 engaged) where the reaction forces in the auger motor 171 are higher. As a result, the ice bin 135 is encouraged to release itself from the ice maker housing.

Figure 6:
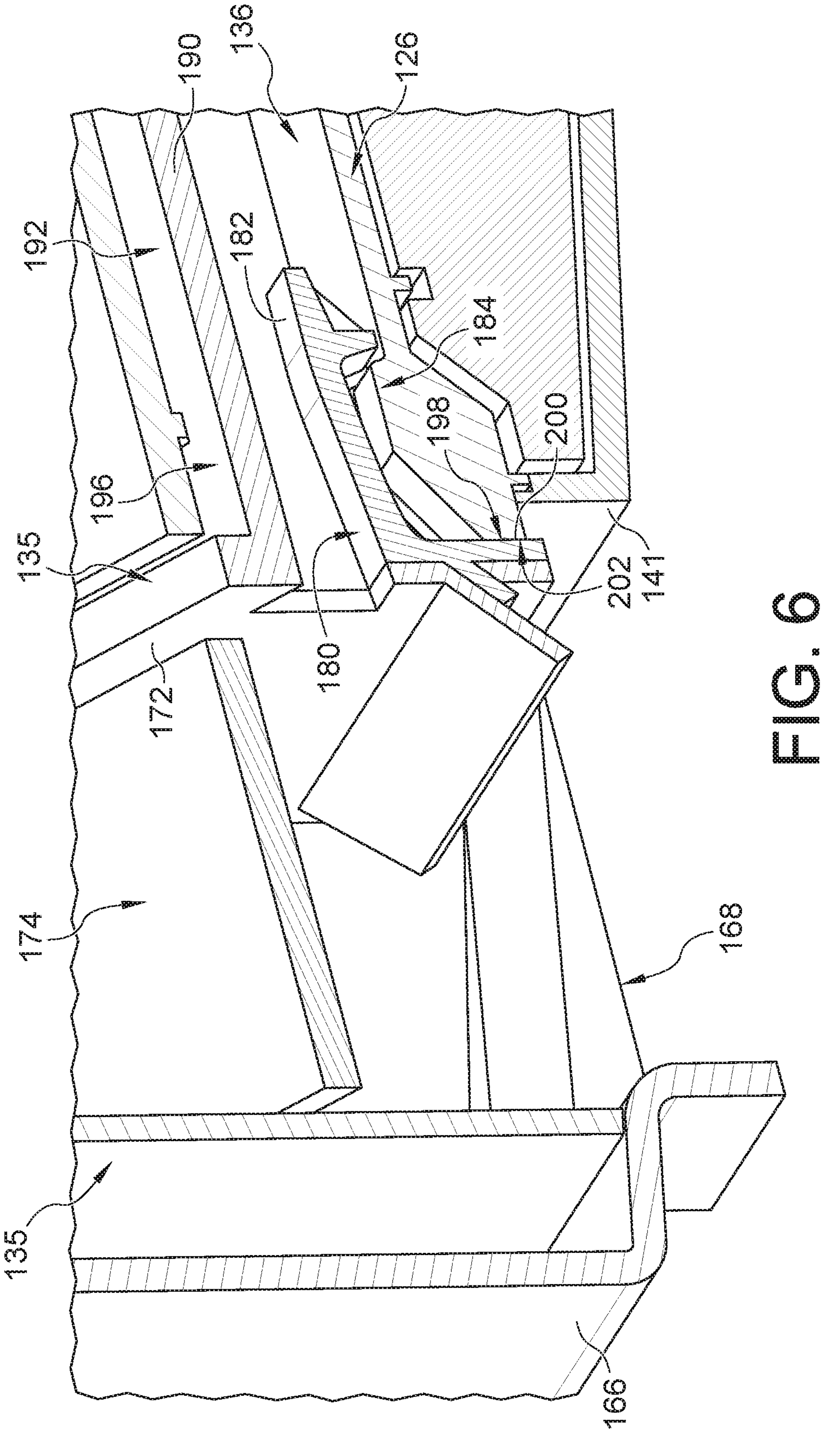
FIG. 6 is a partial cross-sectional view of the ice maker of FIG. 3, depicting an example latch assembly according to the present disclosure in a latched orientation.

Turning next to FIG. 6, to restrict or altogether prevent a gap from forming between the ice bin cover 166 and the front end 141 of the ice maker housing 126 due to the force F and the vibration, the ice maker 125 includes a latch assembly 180, also herein referred to as a snap latch. The latch assembly 180 couples the ice bin 135 to the ice maker housing 126. Absent the latch assembly 180, the ice bin 135 could migrate out of the internal cavity 136, causing the gap, which could allow frost and/or ice to build up along the gap. Ice/frost formed along such gap could adversely affect temperature within the respective storage compartment of the respective refrigeration appliance, thereby affecting quality of food items stored therein, and thus is undesirable. In an extreme case, the force F acting on ice pieces in the ice bin 135 could encourage the ice bin 135 to release itself from the ice maker housing 126.

As illustrated at FIG. 6, which is a partial sectional view of the ice bin retained within the ice maker housing, the latch assembly 180 includes aspects of each of the ice bin 135 and the ice maker housing 126 at a mating region thereof. Generally, the latch assembly 180 includes a pair of angled mating elements which are depicted in a latched orientation engaged/coupled with one another in FIG. 6. The pair of angled mating elements includes a tang 182 and a receiver 184. The angled mating elements are configured to engage one another, such as to snap onto one another, to apply a resisting force R to the ice bin 135 along a second direction that is generally opposite to the aforementioned first direction. The resisting force R is sufficient to counter the driving force F and the concurrent vibration. In one embodiment, the latch assembly 180 is configured to provide a resisting force R in the range of about 30N to about 100N; in another embodiment, in the range of about 40N to about 90N; in another embodiments, in the range of about 50N to about 80N; and in other embodiments, about 60N, about 65N, about 70N, or about 75N.

A removal force be applied by a user to the ice bin 135 to thereby remove the ice bin 135 from the ice maker housing 126. The removal force is applied in the same direction as the driving force F, or in an opposite direction as the resisting force R. The removal force must overcome the resisting force R that is greater than the driving force F. The removal force is generally applied in a horizontal direction, such as the first direction of the driving force F, to cause separation of the pair of mating elements relative to one another. This separation of the mating elements occurs in a direction transverse to each of the first direction and the second direction.

As inferred, to allow for the removal, the resisting force R applied by the latch assembly 180 in the second direction is configured to be less than a removal force necessary to be applied by the user to horizontally separate the ice bin 135 and the ice maker housing 126. It is contemplated that the resisting force R be at least sufficient to counteract the portion of the driving force F applied against the inside wall 172 of the ice bin 135 via the ice pieces disposed therebetween, such that the ice bin 135 is not urged out of the central cavity 136. In other embodiments, the resisting force R can be substantially equal to or even greater than the driving force F.

In one example, the driving force F and the resisting force R each can be a single force. In another example, it is contemplated that either or both of the driving force F and the resisting force R can be an effective force that results from two or more force vectors having different directions and/or magnitudes. In such a case, the resisting force R can represent a resultant force magnitude that is applied to the ice bin 135 along a resultant second direction generally opposed to the resultant force magnitude of the driving force F applied in the resultant first direction, to a degree sufficient to counteract the driving force F and retain the ice bin 135 within the central cavity 136.

Turning now to FIG. 6, the latch assembly 180 in the latched orientation is disposed at the mating engagement of the ice maker housing 126 and the ice bin 135. For example, the depicted latch assembly 180 at least partially extends along a front edge 200 of the ice maker housing 126, where the front edge 200 includes the front surface 198.

Figure 7:
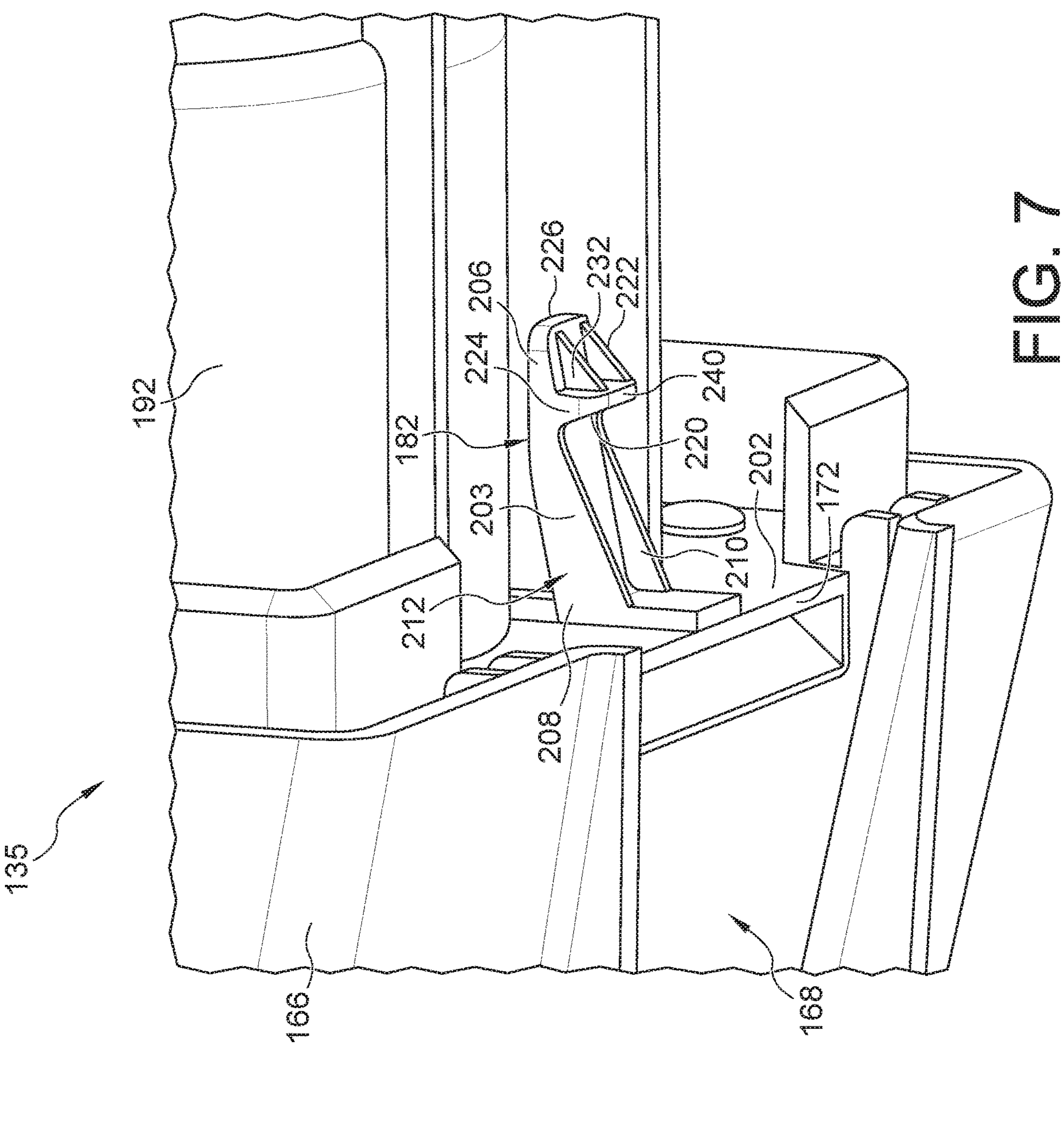
FIG. 7 is a detail partial perspective view of the bottom of the ice bin of FIG. 6, showing one element of the example latch assembly.
Figure 9:
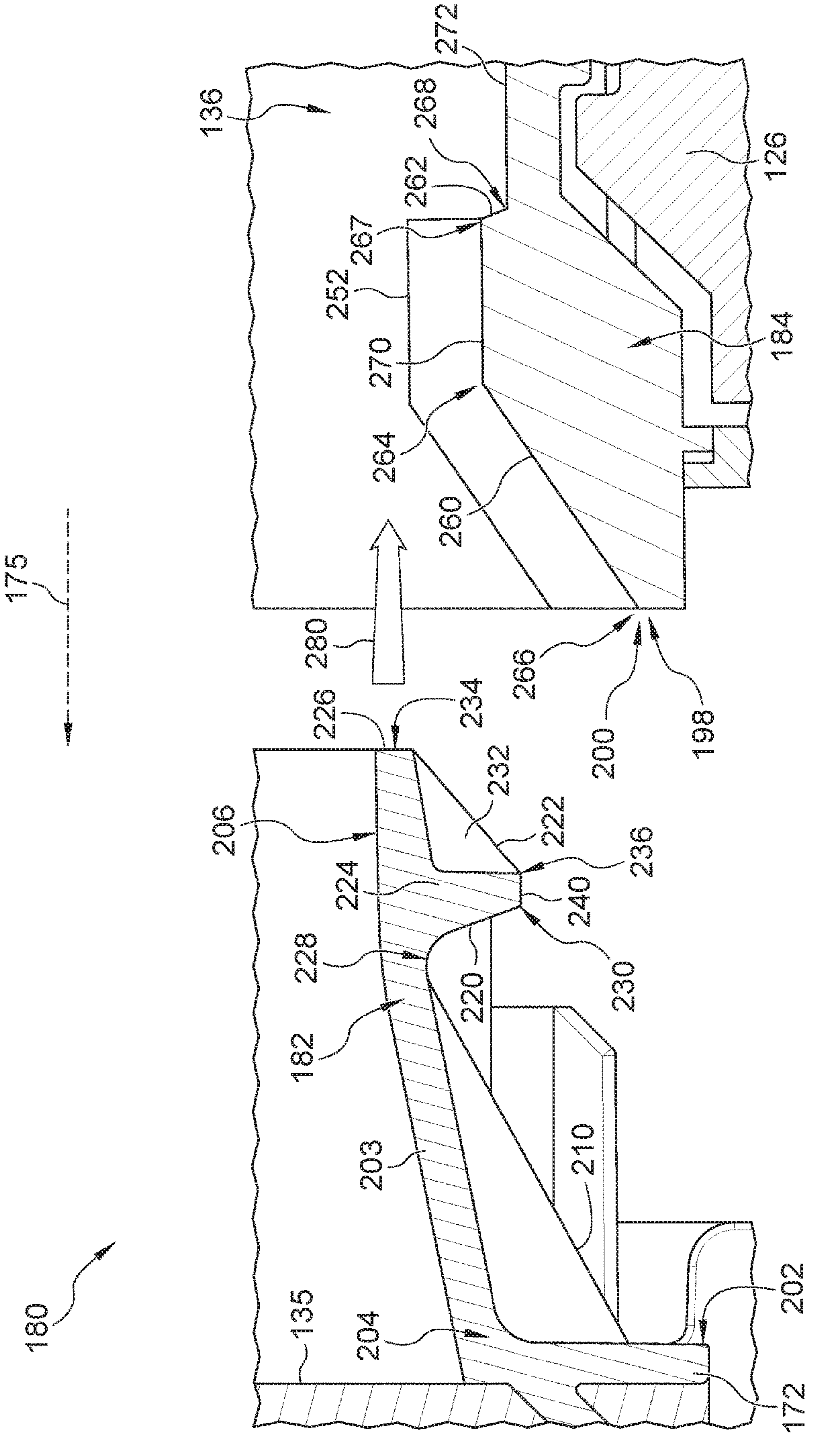
FIG. 9 is a detail perspective view of the latch assembly of FIG. 6 in an unlatched orientation.

Turning next to FIGS. 7 and 9, the tang 182 will be described in detail, including angled surfaces/ramped geometries of the tang 182. Description utilizes terminology of forward, rearward, upper and lower, each of which is used with respect to the arrangement of the ice maker 125 as initially depicted at FIG. 4. It is contemplated that forward is in the direction of the opening 140 and cover 166, while rearward is in the direction of the drive motor 171 and mechanical coupling 173. Description using the terms proximal and distal are made with respect to particular elements, and for this reason, a distal end for a first element may be a rearward end for that first element, while a distal end for a second element may be a forward end for that second element.

The tang 182 is disposed rearward of the cover 166 of the ice bin 135, at an underside of the main body 190. The illustrated tang 182 extends rearward from the front wall 172, and thus rearward of the cover 166. The illustrated embodiment includes only a single tang 182, although one or more additional tangs can be included in other embodiments where suitable. Preferably, the tang 182 is formed integrally with the cover 166 or the front wall 172, although it can also be a separate element that is secured to the cover 166 or to the front wall 172.

The tang 182 longitudinally extends at an upward angle relative to the removal direction along the central axis 175. A longitudinal extension or arm 203 extends between a base 204 and a distal snap 206. Put another way, the tang 182 extends along its length in a direction transverse to a direction of linear translation of the ice bin 135 relative to the ice maker housing 126. The tang 182 is laterally located generally centrally between left and right sides of the ice bin 135. Alternative lateral location can be used in other embodiments where suitable.

At least one base rib 210, and particularly a pair of base ribs 210, can extend downwardly (in a direction opposite the upward opening of the bin cavity 192) from lateral sides 212 of the tang 182, and are located forward (in a direction of the front cover 166) of the distal snap 206. These ribs 210 can aid in controlling the degree or extent to which the tang 182 is enabled to flex or deflect. The ribs 210 are laterally spaced apart from one another and each angles upwardly from the front wall 172 to the distal snap 206. In other embodiments, fewer or additional ribs 210 can be used.

The tang 182 is at least partially flexible at its base 204, to allow for upward deflection of the distal snap 206 in response to engagement with ramped geometry of the receiver 184 during insertion of the ice bin 135 into the internal cavity 136. During latching, subsequent to such upward deflection, the tang 182 is configured to self-relax, to provide the latching orientation. Likewise, the distal snap 206 of the tang 182 will be self-released by deflection from latched engagement with the receiver 184 when the ice bin 135 is pulled outwards form the internal cavity 136 by the user.

The respective ramped geometry of the distal snap 206 of the tang 182 includes a pair of opposed tang angled surfaces. These tang angled surfaces extend transverse to one another and are specifically configured to provide the aforementioned deflection. The pair of angled surfaces includes a tang engagement surface (220) being more proximal (or more forward in the case of the tang 182) and a tang lead surface (222) being more distal (or more rearward in the case of the tang 182).

The tang engagement surface 220 is provided at a forward side of a snap rib 224 that extends generally downwardly from, such as orthogonally to, the longitudinal extension/arm 203 of the tang 182. The tang engagement surface 220 angles in a direction towards a distal tip 226 of the distal snap 206, with an upper base end 228 (FIG. 9) of the tang engagement surface 220 being more proximally/forwardly located than a lower distal tip end 230 (FIG. 9) of the tang engagement surface 220.

A tang lead surface 222 is disposed opposite the tang engagement surface 220, at an opposite side of the snap rib 224. The tang lead surface 222 angles in a direction proximally from the distal tip 226, with an upper base end 234 (FIG. 9) of the tang lead surface 222 being more distally/rearwardly located than a lower distal tip end 236 (FIG. 9) of the tang lead surface 222.

The tang lead surface 222 is provided by at least one distal rib 232, and particularly a pair of distal ribs 232 are provided, each having a tang engagement surface 220 being co-planar with one another. The distal ribs 232 are laterally spaced from one another. In some embodiments, more or fewer distal ribs 232 can be included, or altogether omitted, and instead the tang engagement surface(s) 220 can be provided by an alternative portion of the distal snap 206 replacing the ribs 232. It also is contemplated that one or more ribs could provide the tang engagement surface 220 in some embodiments or that a single planar surface could be provided, such that previous space between ribs 232 could be solid (contain material). The ribs 232 can aid in preventing sink of the distal snap 206 during manufacturing of the ice bin 135.

Extending longitudinally (along the central axis 175) between the tang lead surface 222 and the tang engagement surface 220 is a snap intermediate surface 240. The snap intermediate surface 240 is a lower surface of the tang 182, and extends between the lower distal tip ends 230, 236, with chamfers or beveled edges being disposed therebetween the respective adjacent surfaces. That is, the intermediate surface 240 can be described as including the lower distal tip ends 230, 236. While the depicted surfaces 220, 222 and 240 are continuous with one another, in other embodiments, the surfaces 220, 222 and 240 of the distal snap 206 can be provided other than continuous with one another.

Each of the surfaces 220, 222 and 240 are relatively flat surfaces, with the snap intermediate surface 240 being arranged generally horizontally. Put another way, the intermediate surface 240 is arranged parallel to a surface on which a respective refrigeration unit would stand or parallel to one or more shelves that would be supported in a respective storage compartment containing the ice maker 125.

In one embodiment, the tang 182 can be made of a material having a flexural modulus in the range of about 280 k psi to about 370 k psi; or in a range of about 285 k psi to about 360 k psi; or in a range of about 300 k psi to about 360 k psi; or any of about 284 k psi, about 300 k psi, about 308 k psi or about 360 k psi.

Figure 8:
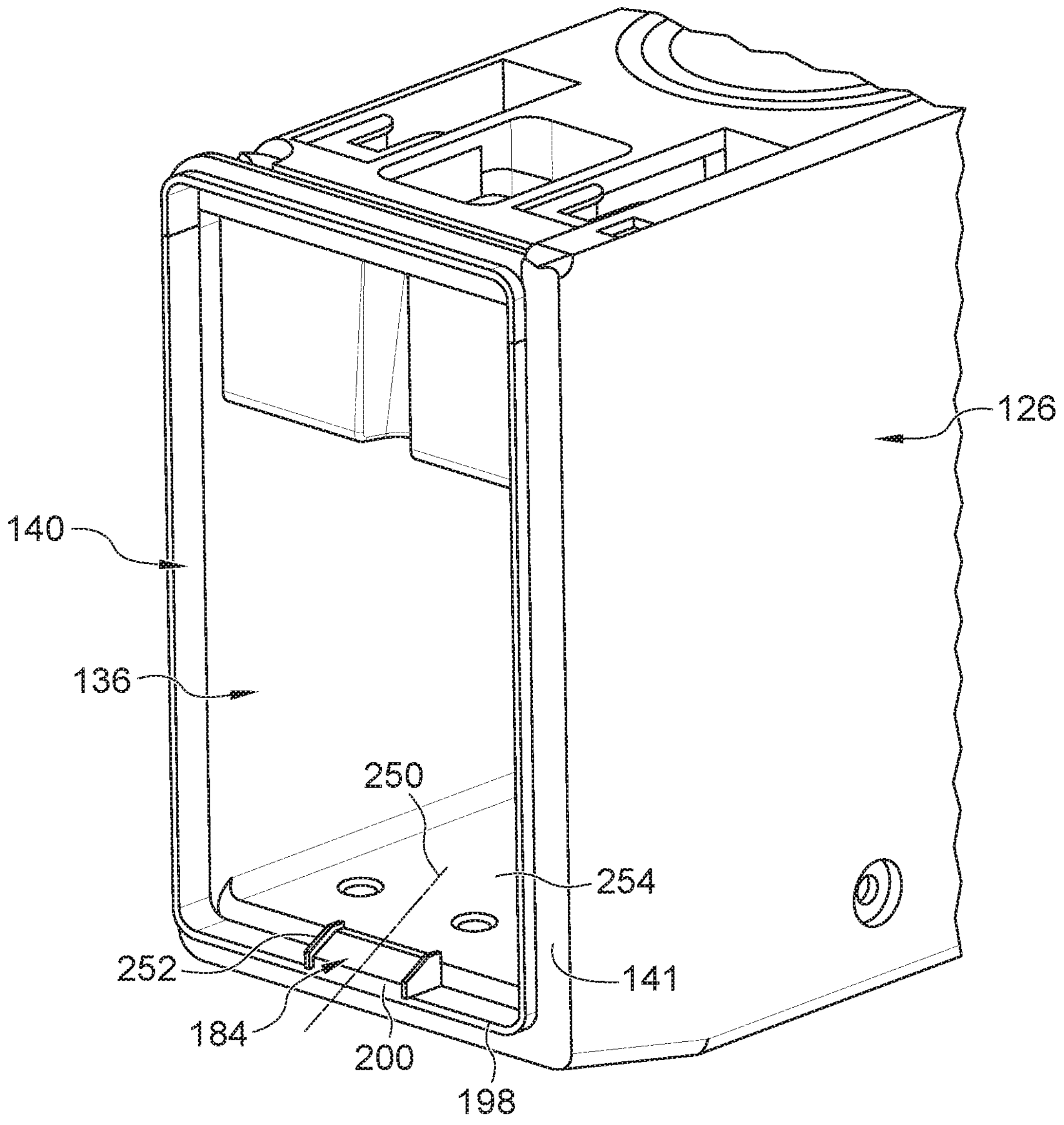
FIG. 8 is a detail partial perspective view of the front of the ice maker housing of FIG. 6, showing another element of the example latch assembly.

Turning next to FIGS. 8 and 9, the receiver 184 will be described in detail, including the angled surfaces/ramped geometries of the receiver 184. The receiver 184 is disposed adjacent the front surface 198 at the front end 141 of the ice maker housing 126. Particularly, the depicted receiver 184 is disposed at an inner periphery of the ice maker housing 126 defining the opening 140.

The receiver 184 is generally rigid, rather than having a flexible portion, and linearly extends in a lateral direction along the edge 200, being a lower front edge of the ice maker housing 126. Preferably, the receiver 184 is formed integrally with ice maker housing 126, although it can also be a separate element that is secured thereto. The lateral direction is defined as being transverse to, such as generally orthogonal to the central axis 175. In some embodiments a longitudinally-extending midline 250 (FIG. 8) of the receiver 184 extending between its front and rear extents is co-planar with the central axis 175.

In some embodiments, the receiver 184 can be otherwise laterally located corresponding to the lateral location of the tang 182. In some embodiments, the receiver 184 can include a flexible component, such as where an upper receiver end 264 is deflected at least partially vertically upwards towards engagement with the tang 182.

At least one laterally-outer guiding rib 252 (FIG. 8), and particularly a pair of laterally-outer guiding ribs 252, can extend upwardly (in a direction towards a ceiling of the internal cavity 136) at the opening 140. These guiding ribs 252 are laterally spaced apart with the respective ramped geometry of the receiver 184 disposed therebetween. Each rib 252 angles upwardly between the edge 200 and the floor 254 of the internal cavity 136. When the ice bin 135 is inserted into the internal cavity 136, the tang 182 is guided between the guiding ribs 252. It is contemplated that one or both of the base ribs 210 could contact or even slide along one or both of the guiding ribs 252. In some embodiments, the guiding ribs 252 can be omitted.

The respective ramped geometry of the receiver 184 between the guiding ribs 252 includes a pair of opposed angled surfaces that extend transverse to one another and that are specifically configured to provide the aforementioned deflection of the tang 182 over and across the receiver 184. The pair of surfaces include a receiver engagement surface (262) being more proximal to the front opening 140 of the ice maker housing 126 (or more rearward in this case of the receiver 184) and a receiver lead surface (260) being more distal from the front opening 140 (or more forward in this case of the receiver 184).

A receiver lead surface 260 is provided at a forward side of the receiver 184, which surface 260 angles downwardly in a direction from within the internal cavity 136 towards the front edge 200, with the upper receiver end 264 (FIG. 9) of the surface 260 being more rearwardly located into the internal cavity 136 than a lower edge end 266 (FIG. 9) of the surface 260. The depicted lower edge end 266 is disposed generally at the edge 200, although space may be provided therebetween in alternative embodiments.

A receiver engagement surface 262 is disposed opposite receiver lead surface 260, at an opposite side of the receiver 184. The receiver engagement surface 262 angles downwardly in a direction proximally from the front surface 198 towards a rear of the internal cavity 136, with an upper receiver end 267 (FIG. 9) of the surface 262 being more forwardly located than a lower inner end 268 (FIG. 9) of the surface 262. It is contemplated that one or both of the surfaces 260 and 262 could be provided by corresponding ribs in alternative embodiments, similar to the tang lead surface 222.

Extending longitudinally (along the central axis 175) between the receiver lead surface 260 and the receiver engagement surface 262 is a receiver intermediate (upper) surface 270. The receiver intermediate surface 270 is the uppermost surface of the receiver 184, and extends between the upper receiver ends 264, 267. That is, the intermediate surface 270 can be described as including the upper receiver ends 264, 267. The upper intermediate surface 270 has a length dimension extending along a direction of insertion and removal of the ice bin 135 and a width/lateral dimension extending orthogonal to the length dimension and along the edge 200, where the width dimension is greater than the length dimension. Additionally, the length dimension of the intermediate surface 270 is greater than a corresponding length dimension of the intermediate surface 240 of the tang 182.

The surface 270, like the surfaces 260 and 262, is relatively flat. The intermediate surface 270 is arranged generally horizontally. Put another way, the intermediate surface 270 is arranged generally parallel to a surface on which a respective refrigeration unit would stand or parallel to one or more shelves that would be supported in a respective storage compartment containing the ice maker 125. With respect to the extents of the intermediate surface 270 along its length dimension, chamfers or beveled edges are disposed between the respective adjacent surfaces 260, 262 and 270. While the depicted surfaces 260, 262 and 270 are continuous with one another, in other embodiments, the surfaces 260, 262 and 270 can be provided other than continuous with one another.

A chamfer or bevel also is disposed between the receiver engagement surface 262 and a resting surface 272, disposed rearwardly of the receiver 184. In the illustrated embodiment, the resting surface 272 is a frontward portion of the floor 254 of the internal cavity 136. In other embodiments, one or more surfaces and/or elements can be disposed between the resting surface 272 and the floor 254.

Figure 10:
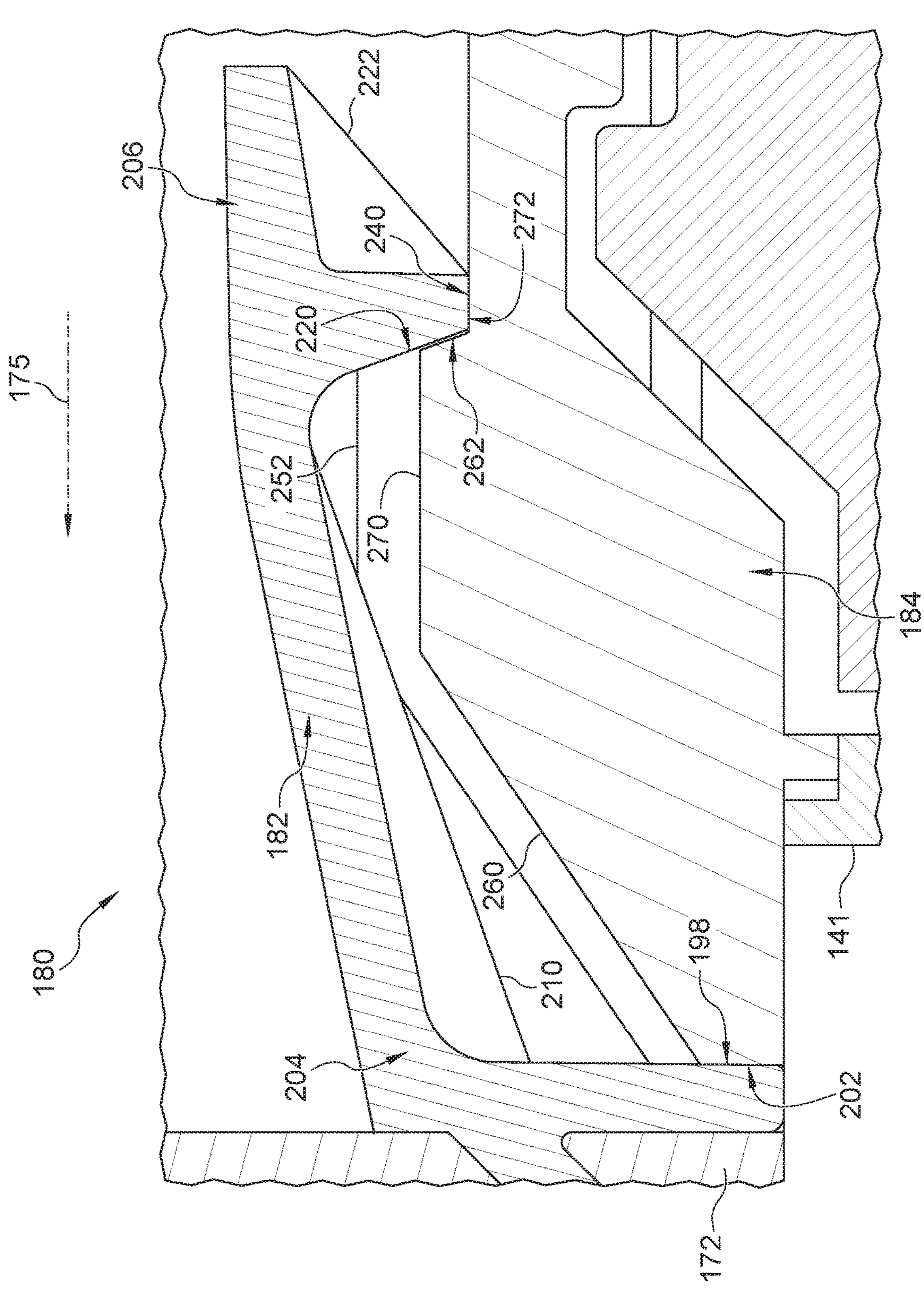
FIG. 10 is a detail perspective view of the latch assembly of FIG. 6 in a latched orientation.

Turning now specifically to FIGS. 9 and 10, when the tang 182 is latched onto the receiver 184, the latch assembly 180 is in a latched orientation (FIG. 10) disposed internal to the ice maker housing 126. In the illustrated embodiment, the latched latch assembly 180 is disposed fully within the ice maker housing 126, and specifically within the internal cavity 136. Also at the latched orientation depicted at FIG. 6, the front surface 198 at the front end 141 is disposed adjacent, and preferably engaged against, a rear-facing surface 202 of the front wall 172, thus preventing a gap from forming at this location between the ice maker housing 126 and the ice bin 135.

In some embodiments, the rear-facing surface 202 and the front surface 198 may not be contiguous with one another. Rather, a purposely dimensioned gap therebetween can be closed by any other suitable surfaces, extensions, etc. of the ice maker housing 126 and/or of the ice bin 135 when the latch assembly 180 is in a latched orientation. In some embodiments, a gasket may be disposed therebetween.

This closure of the ice maker 125 is particularly effected by the corresponding ramped geometries of each of the tang 182 and the receiver 184. As described above, the tang 182 includes the pair of surfaces 220, 222, and the receiver 184 includes the pair of surfaces 260, 262. That is, the ramped geometries of the latch assembly 180 include at least two pairs of the surfaces 220, 222, 260, 262.

The aforementioned detailed surfaces 220, 222 and 240 are configured to each engage one or more of the surfaces 260, 262 and 270, and vice versa during latching and unlatching of the latch assembly 180, as will be detailed. Briefly, during linear insertion or removal of the ice bin 135 relative to the internal cavity 136 along the central axis 175, each surface 220 and 260 is arranged to slide against an angled surface of the other pair (of the other element 182, 184).

These angled surfaces are configured to ensure reasonable insertion and removal forces and to better effect deflection of a distal snap 206 of the tang 182. The geometries also maintain the latch assembly 180 in its latched orientation overcoming the forces generated by the ice dispenser 132 to restrict or altogether prevent separation of the latch assembly 180, unintended withdrawal of the ice bin 135, and a consequent gap from forming between the ice maker housing 126 and the ice bin 135. Further, these geometries enable the latch assembly 180 to be decouplable without a need for the user to engage the latch assembly 180 directly or via an actuator indirectly. Accordingly, the latch assembly 180 can feasibly be hidden within the ice maker 125 when in its latched orientation, as described above.

As is apparent, FIG. 9 depicts the latch assembly 180 in an unlatched orientation. At the orientation of FIG. 9, where the rear end of the main body 190 of the ice bin 135 is already received into the internal cavity 136, thereby aligning the tang 182 relative to the receiver 184, the insertion/removal direction of the ice bin 135 is disposed generally along respective horizontals (e.g., parallel to the floor supporting the respective refrigeration appliance). Likewise, the illustrated intermediate surfaces 240 and 270 each are also disposed generally along respective horizontals. Of note, the intermediate surfaces 240 and 270 are not coplanar in the illustrated embodiment. Rather, these surfaces are vertically spaced from one another with the intermediate surface 240 of the tang 182 disposed vertically below the upper intermediate surface 270 of the receiver 184, thus providing a negative distance. This allows for the deflection of the distal snap 206 and corresponding latching of the distal snap 206 at the receiver 184. It is contemplated that in other embodiments, one or both of the intermediate surfaces 240 and 270 may not be parallel to the floor and/or may not be parallel to each other.

When the ice bin 135 is inserted rearwardly into the ice maker housing 126, this brings the tang 182 along the generally horizontal insertion direction 282 (FIG. 9) into engagement with the receiver 184 ultimately provides the latched orientation of the latch assembly 180 illustrated in FIG. 10. Particularly, upon initial movement of the horizontally-separated elements 182, 184 towards one another, the lead surfaces 222 and 260 are configured to be the first surfaces to engage one another.

The particularly designed angles A and D of the tang 182, and the receiver 184 enable the distal snap 206 of the tang 182 to be deflected upwards onto the intermediate surface 270 of the receiver 184. For example, the snap angle A of the tang lead surface 222 relative to the horizontal (e.g., relative to a surface on which a respective refrigeration unit would stand or relative to one or more parallel shelves supported in a respective storage compartment containing the ice maker 125) is in the range of about 5 degrees inclusive to about 60 degrees inclusive. Alternatively, the angle A can be in the range of about 20 degrees inclusive to about 50 degrees inclusive, or in the range of about 40 degrees inclusive to about 45 degrees inclusive, or more particularly about 41 degrees. The corresponding receiver angle D of the receiver lead surface 260 relative to the horizontal can be in the range of about 0 degrees inclusive to about 60 degrees inclusive. Alternatively, the angle D can be in the range of about 10 degrees inclusive to about 40 degrees inclusive, or in the range of about 30 degrees inclusive to about 35 degrees inclusive, or more particularly about 34 degrees.

Any aforementioned suitable combination of these angles A and D enables the distal snap 206 to vertically deflect above the receiver 184, with the intermediate surfaces 240, 270 engaging one another. Likewise, these suitable angles allow for a user to easily finish inserting the ice bin 135 into the internal cavity 136, to engage the mechanical coupling 173 with the drive motor 171, and finally to latch together the latch assembly 180.

But first, subsequent to the deflection of the distal snap 206, continued linear insertion of the ice bin 135 causes the snap intermediate surface 240 to slide over the receiver intermediate surface 270, as mentioned. Subsequently, after the intermediate surfaces 240, 270 slide over one another during insertion, the distal snap 206 is released in a downward vertical direction to thereby hang over the receiver 184 in the latched orientation of FIG. 10.

In some embodiments, such as illustrated at FIG. 10, the receiver engagement surface 262 and the tang engagement surface 220 can be spaced from one another by a gap in the latched orientation. Alternatively or additionally, in some embodiments, the receiver engagement surface 262 and the tang engagement surface 220 can be in engagement with one another in the latched orientation.

In other embodiments, the snap intermediate surface 240 and the resting surface 272 can be in engagement with one another, such as illustrated in FIG. 10. Alternatively or additionally, in some embodiments, the snap intermediate surface 240 and the resting surface 272 can be spaced from one another.

In the latched orientation, the particularly designed angles B and C of the tang 182, and the receiver 184 enable the distal snap 206 of the tang 182 to be retained rearward of the receiver 184, and for the resisting force R (FIG. 3) to be applied to the ice bin 135 to counter at least the portion of the driving force F applied to the ice bin 135. For example, the snap angle B of the tang engagement surface 220 relative to the horizontal is in the range of about 30 degrees inclusive to about 90 degrees inclusive. Alternatively, the angle B can be in the range of about 40 degrees inclusive to about 80 degrees inclusive, or in the range of about 65 degrees inclusive to about 75 degrees inclusive, or more particularly about 70 degrees. The corresponding receiver angle C of the receiver engagement surface 262 relative to the horizontal can be in the range of about 90 degrees inclusive to about 150 degrees inclusive. Alternatively, the angle C can be in the range of about 95 degrees inclusive to about 125 degrees inclusive, or in the range of about 95 degrees inclusive to about 105 degrees inclusive, or more particularly about 100 degrees.

Any aforementioned suitable combination of these angles B and C enables the distal snap 206 to be retained by the receiver 184 countering at least the aforementioned partial force F of the drive motor 171. Further, in that the two pairs of surfaces 220/222, 260/262 are designed to provide easier insertion than removal, the lead surface 222, 260 of each respective pair has a lesser angle (compared to the horizontal) than the engagement surface 220, 262 of the respective pair (also compared to the horizontal).

Finally, at removal of the ice bin 135 from the internal cavity 136, causing unlatching of the latch assembly 180, the aforementioned suitable combinations of the angles B and C causes the distal snap 206 to be deflected up onto the intermediate surface 270. This deflection causes the engagement surfaces 220, 262 to be vertically separated from one another. Indeed, the tang engagement surface 220 will be raised above the receiver engagement surface 262.

In view of the above, insertion and removal of the ice bin 135 and corresponding latching and unlatching of the latch assembly 180 has been detailed.

During said latching/unlatching, it is contemplated that in some embodiments, the angled mating elements can be configured to engage one another along at least one linearly extending mating line, and particularly along a plurality of linearly extending mating lines. That is, during insertion and removal of the ice bin 135 from the ice maker housing 126, any one surface of the tang 182 can have only a single line of engagement with a corresponding surface of the receiver 184 when engaged with one another such that one of these corresponding surfaces moves along the other. These laterally-extending single lines of engagement, as compared to additional surface-engagement between the corresponding surfaces, can allow for reduced friction and thus easier insertion and removal of the ice bin 135.

For example, a single line of engagement can be provided during engagement of the lead surfaces 222, 260, such as by the lower distal tip end 236 of the tang lead surface 222 along the receiver lead surface 260. A single line of engagement can be provided during the engagement of the intermediate surfaces 240, 270, such as by the lower distal tip end 230 of the intermediate surface 240 along the fixed intermediate surface 270. Alternatively, a greater surface engagement of the intermediate surfaces 240, 270 can be caused by suitable configuration of the tang 182 and the receiver 184.

Similarly, a single line of engagement can be provided during the engagement of the engagement surfaces 262 and 220, such as upon removal of the ice bin 135, such as by the upper receiver end 267 of the engagement surface 262 along the moving tang engagement surface 220. In various embodiments, any one or more of these single lines of engagement can occur.

Figure 11:
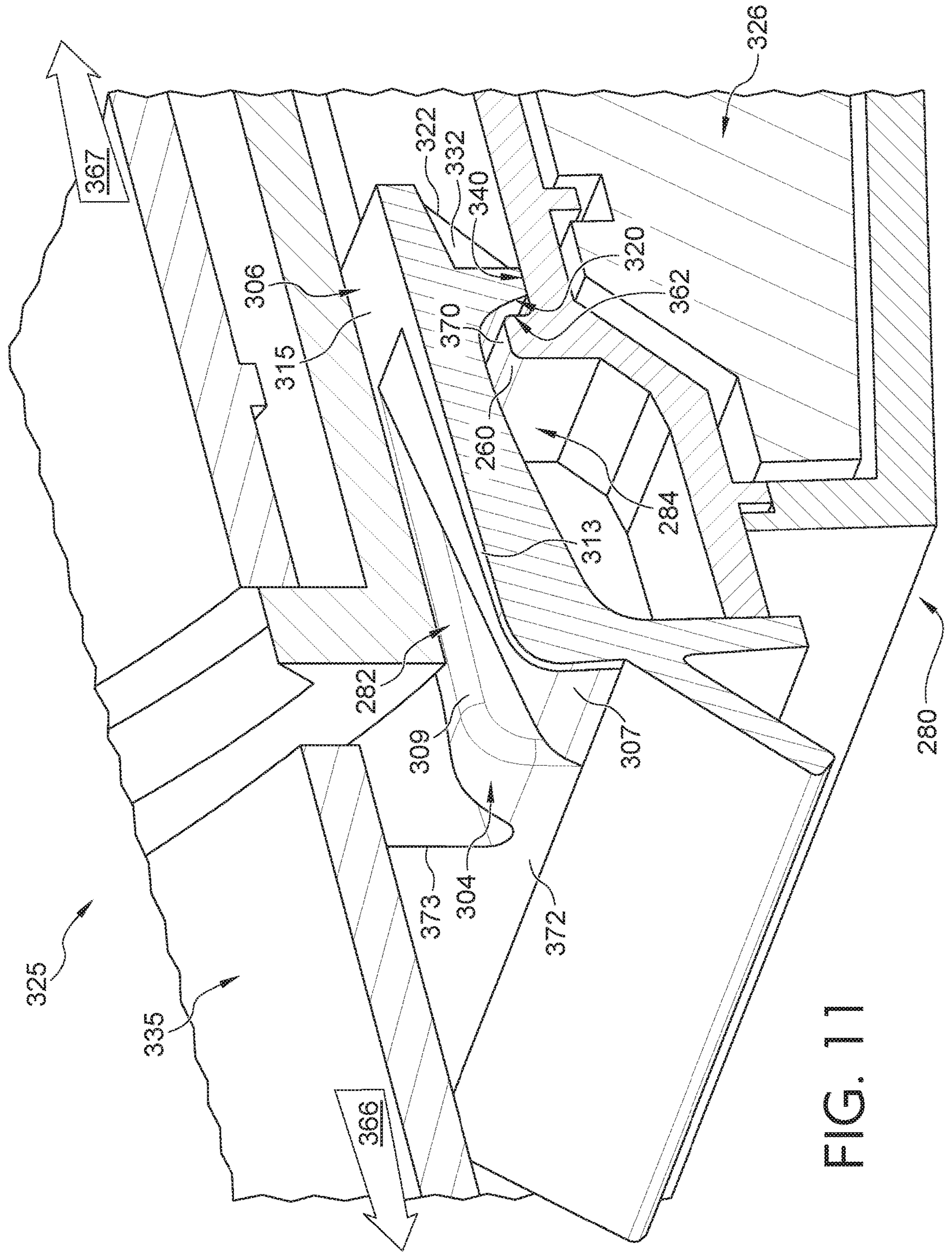
FIG. 11 is a detail perspective view of another embodiment of a latch assembly in a latched orientation, which latch assembly can be used with the ice maker of FIGS. 3 and 4.

Turning now to FIG. 11, another embodiment of an example latch assembly is depicted at 280. The latch assembly 280 is substantially similar to the latch assembly 180 (FIG. 9) discussed above except as discussed below. It will be appreciated that aspects of the latch assembly 280 can be incorporated into the latch assembly 180 and vice versa.

As illustrated at FIG. 11, which is a partial sectional view of an ice maker 325, the latch assembly 280 includes aspects of each of an ice bin 335 and the ice maker housing 326 at a mating region thereof. Generally, the latch assembly 280 includes a pair of angled mating elements 282 and 284 which are depicted in a latched orientation engaged/coupled with one another in FIG. 11. The angled mating elements 282, 284 are configured to engage one another to apply a resisting force to the ice bin 235. Specifically, the tang 282 is shown engaged with and latched onto the receiver 284. The description of engagement and disengagement of the tang 182 and receiver 184 (FIG. 9) relative to one another is equally applicable to the engagement and disengagement of the tang 282 and receiver 284 relative to one another.

The tang 282 includes an arm 303 extending between a base end 304 and a distal snap 306. The base end 304 extends from and is integral with the front wall 372. The base end 304 extends at least partially vertically into a window 373 of the front wall 372, allowing room for the base end 604 to extend at least partially vertically from the front wall 372.

Similar to the tang 180 previously described, a central portion 307 of the arm 303 extends in a direction generally upwardly from a horizontal direction, from the base end 304 to the distal snap 306. A pair of support ribs 309 strengthen the arm 303 and are disposed at opposed lateral sides of the central portion 307. Each support rib 309 extends from the base end 304, along the central portion 307 to a forward end of the distal snap 306 (forward in relation to the ice bin cover front 366 and ice bin rear end 367. The support ribs 309 each have a rib upper surface 313 that is generally planar with a snap upper surface 315 of the distal snap 306.

The illustrated central portion 307 has a lateral width orthogonal to the length of the central portion 307 between the base end 304 and the distal snap 306, which lateral width is generally constant along its length. Additionally, the lateral width of the central portion 307 is greater than a lateral width of either of the support ribs 309. It is contemplated that the respective widths may be different in other embodiments.

Similar to the distal snap 206 of the tang 180 (FIG. 9), the distal snap 306 of the tang 280 includes a pair of distal ribs 332 providing a snap engagement surface 320, an opposite snap engagement surface 322, and a snap intermediate surface 340 disposed therebetween. It is contemplated that the surfaces 320 and 322 have the same respective angles A and B as described above with respect to the distal snap 206 (FIG. 9).

Turning now to the receiver 284, the same respective angles C and D are provided with respect to the receiver lead surface 360 and receiver engagement surface 362. Though, these surfaces 360 and 362 are somewhat differently arranged relative to one another as compared to the previous receiver 184 (FIG. 9). That is, the receiver 284 has a receiver lead surface 360 that has a smaller surface area as compared to the previous receiver lead surface 260 (FIG. 9). A receiver intermediate surface 370 is disposed between the surfaces 360 and 362, and also has a smaller surface area than the receiver intermediate surface 270 of the receiver 184 (FIG. 9).

Turning now to FIGS. 12-16, another example ice maker 525 is illustrated, which can be used with a suitable refrigeration appliance, such as the refrigerator 10 previously described, where the ice maker 525 would be located in the upper fresh food compartment 14. The ice maker 525 is substantially similar to the icemaker 125 (FIG. 4) discussed above except as discussed below. Features of the icemaker 525 that are similar to the icemaker 125 utilize the same technical feature numbers, but increased by a count such as 400. It will be appreciated that aspects of the icemaker 525 can be incorporated into the icemaker 125 and vice versa.

The icemaker 525 includes an ice bin 535 receivable into an ice maker housing 526. Generally, the icemaker 525 includes a latch assembly 580 that is similar to but provides alternative structure than the latch assembly 180 (FIG. 9). The latch assembly 580 similarly includes a tang 582 at the ice bin 535 and at the ice maker housing 526, a receiver 584 for engaging with, such as snapping onto, the tang 582. As with the latch assembly 180, the tang 582 is incorporated at the removeable ice bin 535, and the receiver 584 is incorporated at the ice maker housing 526.

Figure 12:
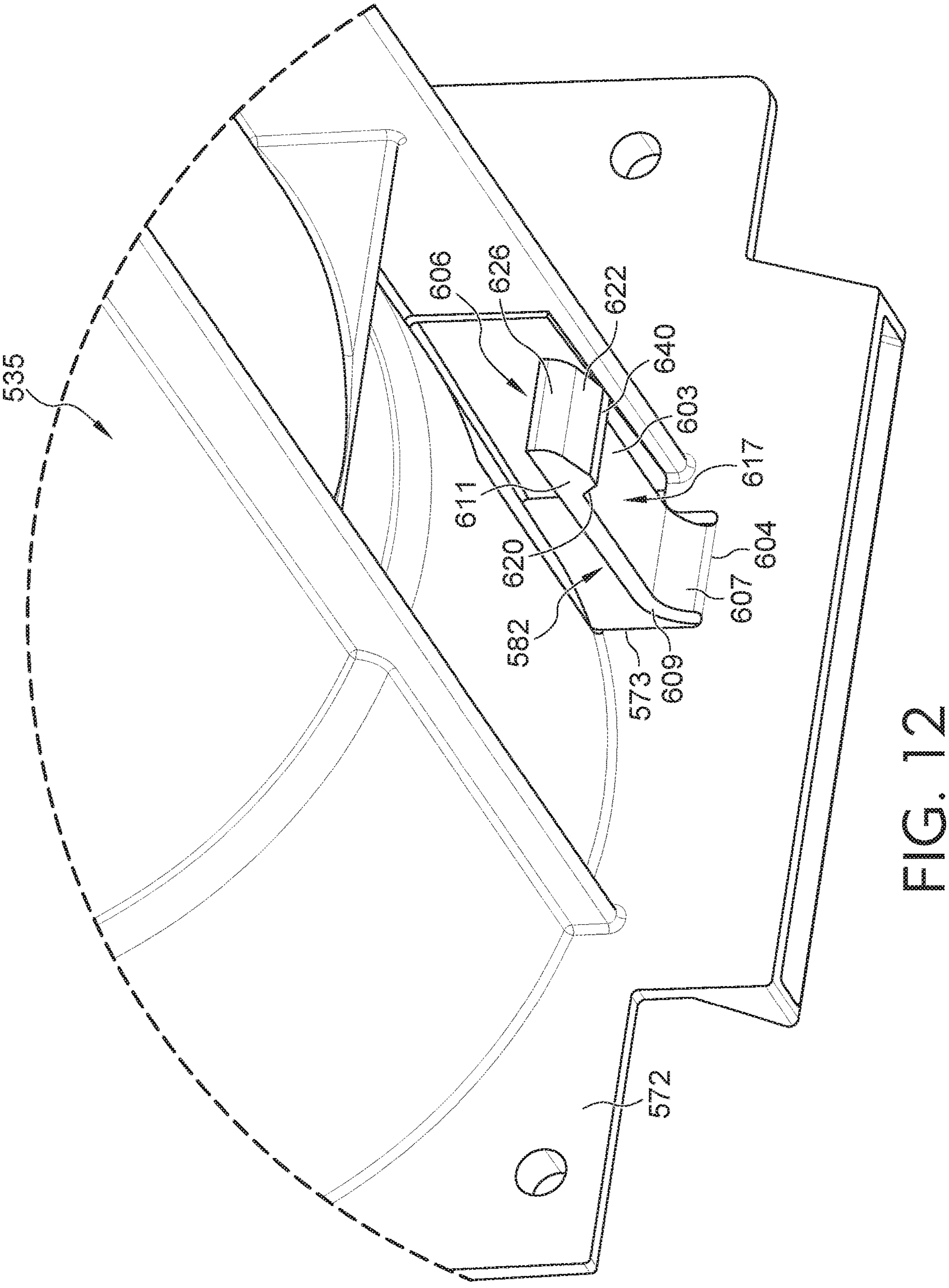
FIG. 12 is a detail partial perspective view of the bottom of the ice bin of another example embodiment of an icemaker for use in a refrigeration appliance such as the refrigerator of FIG. 1.
Figure 13:
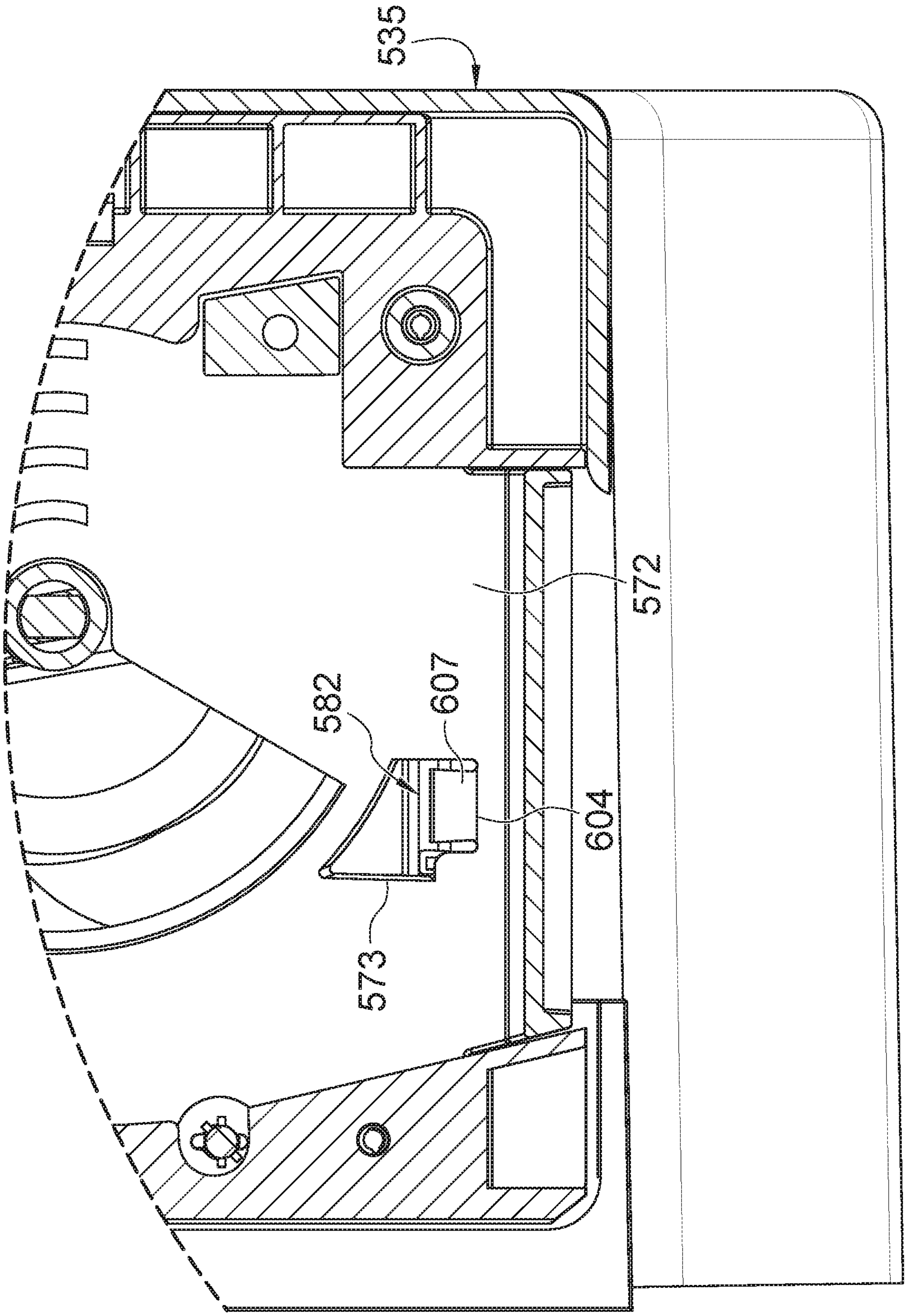
FIG. 13 is a front view of the ice bin of FIG. 12, showing the front side of the front wall shown in FIG. 12.

Turning first to FIGS. 12 and 13, the tang 582 has a flexible base end 604 of the arm 603, which base end 604 is integral with the front wall 572. The base end 604 is at least partially disposed in a window 573 of the front wall 572, allowing room for the lower section 607 of the base end 604 to extend vertically from the front wall 572. An intermediate curved section 609 of the arm 603 extends from the lower section 607, with a distal section 611 extending therefrom and having the distal snap 606. The arm 603 extends generally parallel to an insertion direction of the ice bin 535 into the ice maker housing 526. In one embodiment, the lower section 607 and the intermediate curved section 609 have a substantially constant thickness between upper and lower surfaces 613 and 615.

The distal snap 606 includes a generally flat distal snap lead surface 622, a generally flat distal snap intermediate surface 640, and a generally flat proximal snap engagement surface 620. Ribs are omitted from the distal snap 606 as compared to the previous distal snap 206 (FIG. 9). Ribs also are omitted from the underside of the arm 603 as compared to the previous tang arm 203 (FIG. 9). Also, as compared to the generally flat distal tip 226 of the previous distal snap 206, this distal snap 606 includes a distal tip 626 being rounded and having a greater filleted distal area.

Figure 14:
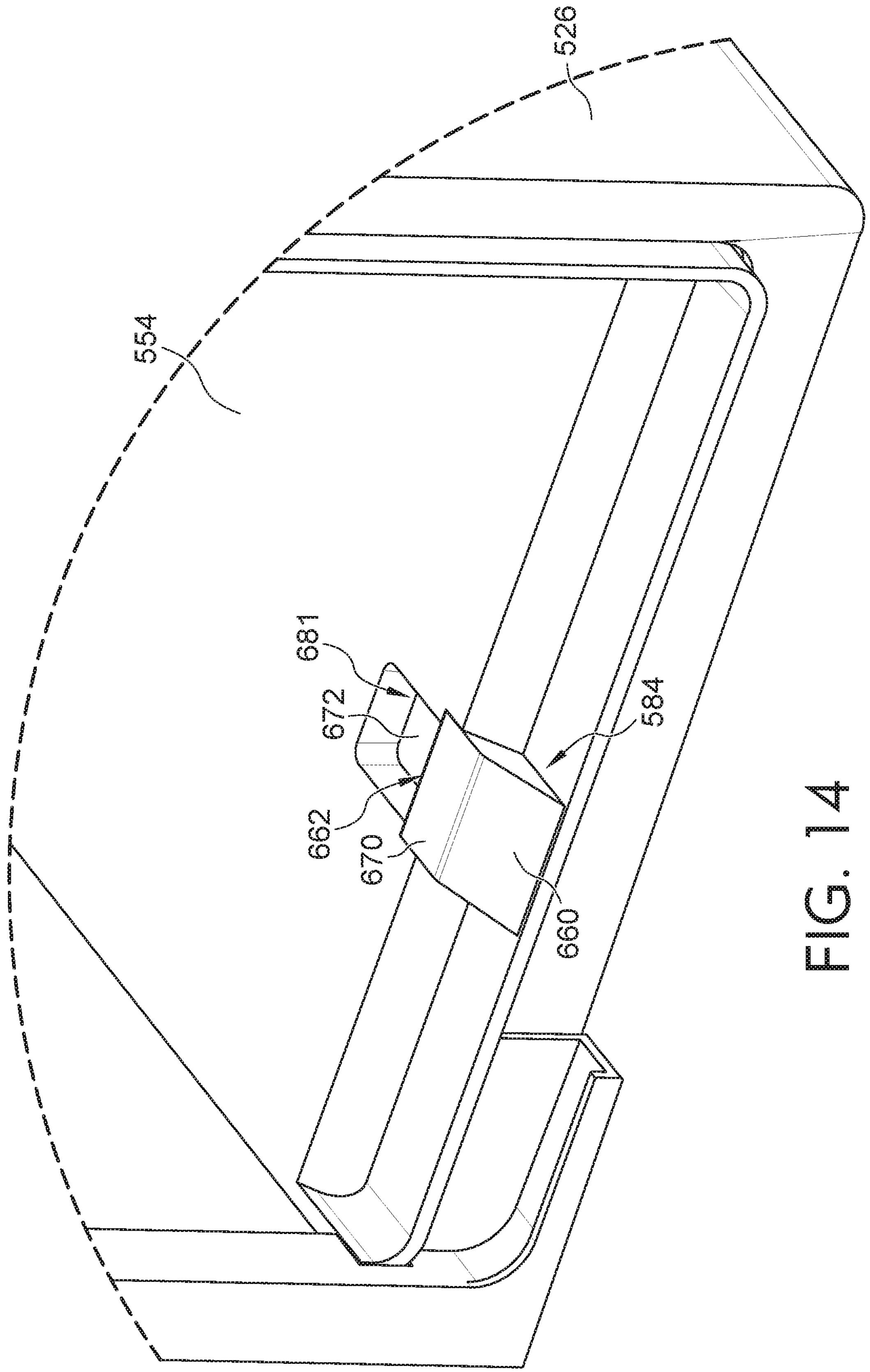
FIG. 14 is a detail partial perspective view of the front of the ice maker housing of the additional example embodiment of an icemaker, the ice maker housing for receiving the ice bin as detailed at FIGS. 12 and 13.
Figure 15:
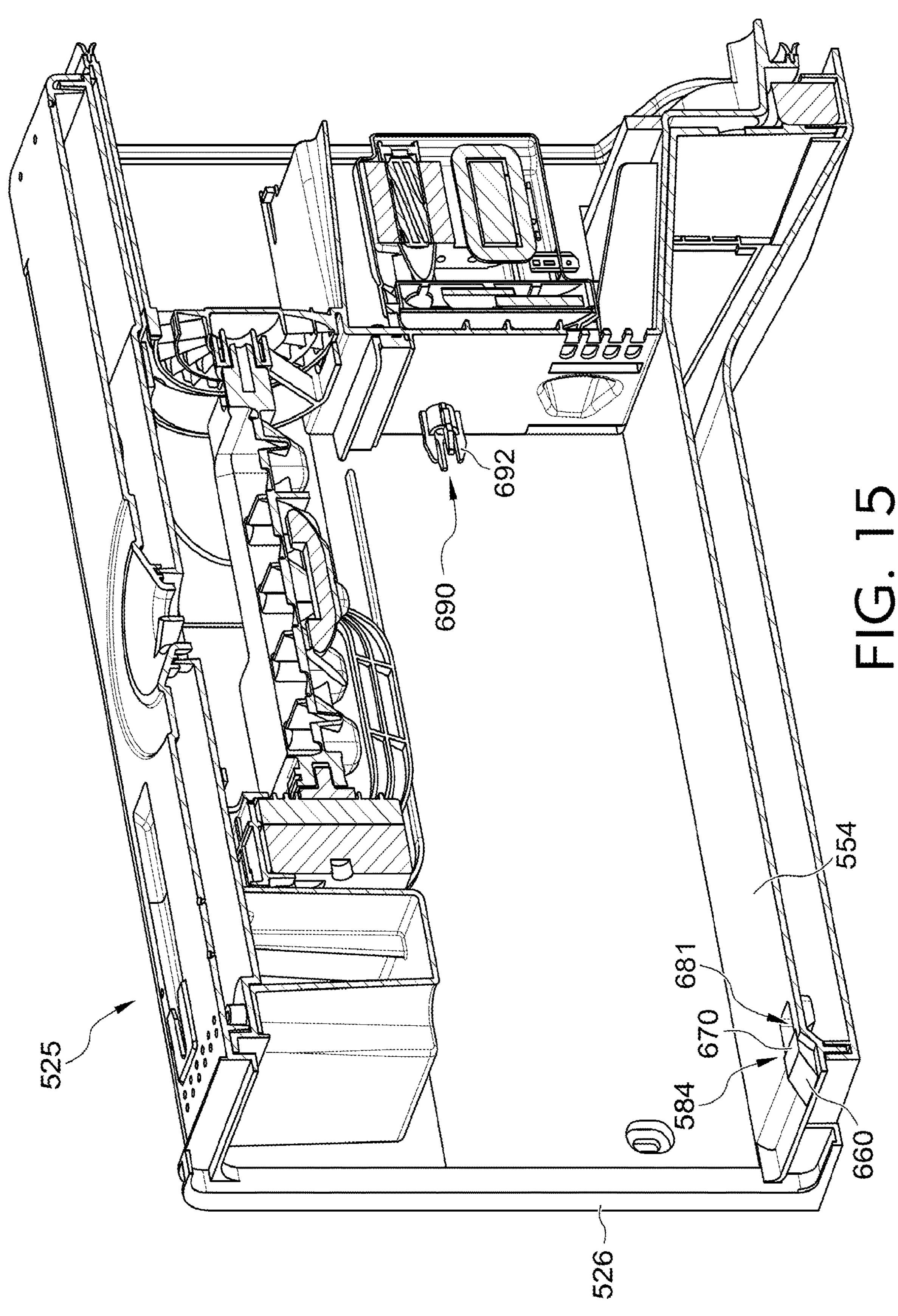
FIG. 15 is a detail cross-sectional view of the ice maker housing of FIG. 14.

Turning next to FIGS. 14 and 15, the ramped receiver 584 includes a generally flat receiver lead surface 660, a generally flat receiver intermediate surface 670, and a generally flat receiver engagement surface 662. As compared to the receiver 184 (FIG. 9), the receiver engagement surface 662 has a vertical height disposed between the lower surface 672 and the receiver intermediate surface 670 that is greater than a comparable distance between the receiver intermediate surface 270 and the resting surface 272 of the previous receiver 184 (FIG. 9). Particularly, the lower surface 672 is a bottom of a depression 681 disposed in the floor 554. Additionally, as compared to the previous receiver 184 having laterally-outer guiding rib 252 (FIG. 8), this receiver 584 omits laterally-outer guiding ribs.

Figure 16:
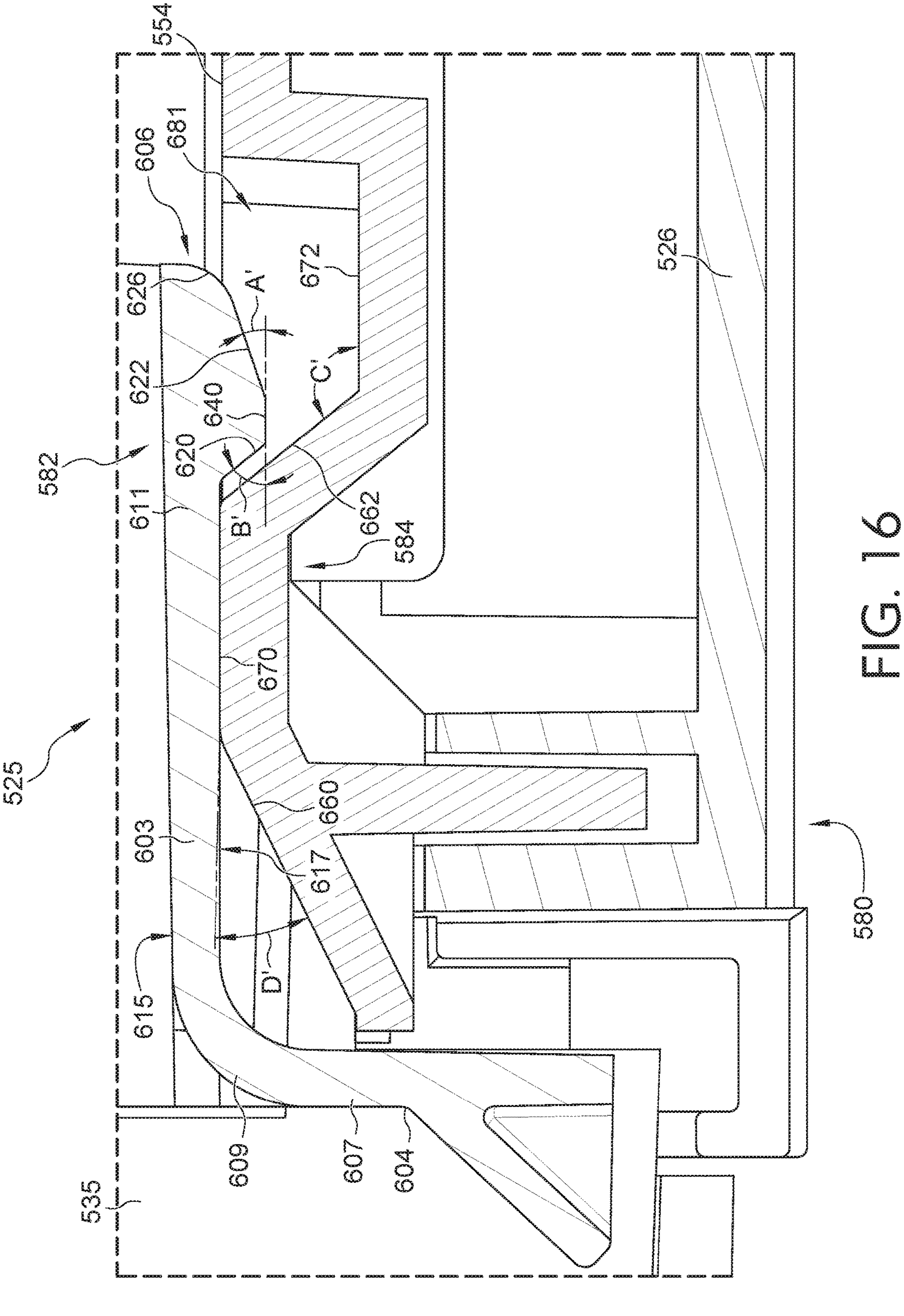
FIG. 16 is a detail partial perspective view showing a latched orientation of the separate elements of the latch assembly of the additional example embodiment of an icemaker, as shown in FIGS. 12-15.

Turning to FIG. 16, the receiver 584 and the tang 582 are illustrated in a latched orientation of the latch assembly 580. As compared to the angles A, B, C and D of the previous latch assembly 180 (FIG. 9), the angles A', B', C' and D' of this latch assembly 580 are modified. For example, angles A', B' and C' are smaller than comparative angles A, B and C (FIG. 9), and the angle D' is greater than the comparative angle D (FIG. 9). A negative distance still is disposed between the receiver intermediate surface 670 and the distal snap intermediate surface 640. That is, when the ice bin 535 is only partially received into the ice maker housing 526, and the latch assembly 580 still is in an unlatched orientation, the receiver intermediate surface 670 is disposed vertically below the distal snap intermediate surface 640.

In the illustrated embodiment, when the receiver 584 and the tang 582 are latched, the lower surface 615 of the arm 603 is disposed adjacent the receiver intermediate surface 670. In some embodiments, the lower surface 615 and the receiver intermediate surface 670 can be in surface engagement or in single line engagement with one another.

Also in the illustrated latched orientation, the distal snap engagement surface 620 is fully spaced from the receiver engagement surface 662. In other embodiments, the distal snap engagement surface 620 and the receiver engagement surface 662 can be in surface engagement or in single line engagement with one another.

An additional snap latch 690 is optionally included at a rear of the chamber of the ice maker housing 526 receiving the ice bin 535. This additional snap latch 690 includes a plurality of fingers 692 extending in a direction of the ice bin 535. At least a portion of the fingers 692 can be received into a respective opening (not shown) at a rear wall of the ice bin 535 when inserted into the ice maker housing 526 for further aiding in retaining the ice bin 535 at the ice maker housing 526, and/or to provide resistance to rotational motion of the ice bin 535 against the torque of the auger rotating within the ice bin.

In summary, a refrigeration appliance 10 includes an ice maker 125, 325 for freezing water into ice pieces. The ice maker 125, 325 includes an ice maker housing 126, 326, an ice making unit 156 for making the ice pieces, a removeable ice bin 135, 335, 535 receiving the ice pieces, and an ice dispenser 132 having a rotatable auger 170 that drives the ice pieces out of the removable ice bin 135, 335 to a bin aperture 168 at the ice bin 135, 335 via a driving force F applied in a first direction. A latching assembly 180, 280 is provided at least partially at each of the removeable ice bin 135, 335 and the ice maker housing 126, 326, and is configured to apply a resisting force R to the ice bin 135, 335 at least along a second direction opposite the first direction. The removable ice bin 135, 335 is selectively removable from the ice maker housing 126, 326 by the user applying a removal force greater than the driving force F to the ice bin 135, 335 in the first direction. The latching assembly 180, 280 includes a complementary tang 182, 282 and receiver 184, 284 each having corresponding and complementary ramped geometry that is configured to transfer a respective linear pushing force or linear pulling force of a user acting on the ice bin 135, 335 into a deflection of a distal end 206 of the tang 182, 282 over the receiver 184, 284 to thereby cause respective coupling or decoupling of the latch assembly 180, 280.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims and their equivalents.

What is claimed is:

1. A refrigeration appliance, comprising:

at least one of a fresh food compartment for storing food items in a refrigerated environment having a target temperature above zero degrees Centigrade or a freezer compartment for storing food items in a sub-freezing environment having a target temperature below zero degrees Centigrade;

an ice maker assembly disposed within the fresh food compartment or the freezer compartment for freezing water into ice pieces, the ice maker assembly comprising an ice maker housing and a removable ice bin for storing the ice pieces produced by an ice making apparatus within the ice maker housing;

a rotatable auger positioned within the ice bin and configured to drive the ice pieces out of the ice bin via a driving force applied in a first direction; and a latch assembly having a pair of angled mating elements configured to engage one another along at least one linearly extending mating line to apply a resisting force to the ice bin along a second direction opposed to the first direction, the resisting force being sufficient to counter a portion of the driving force applied to the ice bin when the latch assembly is in a fully engaged orientation, wherein the pair of angled mating elements includes a tang and a receiver, wherein the tang includes a longitudinally extending arm and a distal snap extending from said arm, wherein at least one distal rib extends from said distal snap, wherein the receiver includes a pair of opposed angled surfaces, including a receiver lead surface and a receiver engagement surface, with a receiver intermediate surface therebetween, wherein during assembly of the latch assembly into the ice bin, the at least one distal rib and the receiver lead surface are configured to engage one another first, wherein the receiver further includes a resting surface adjacent to the receiver engagement surface, wherein the resting surface is configured to abut a tang intermediate surface that extends between a pair of opposed tang angled surfaces when the latch assembly is in the fully engaged orientation, wherein a removal force applied by a user to remove the ice bin from the ice maker housing causes separation of the pair of angled mating elements relative to one another, said separation occurring in a direction transverse to each of the first direction and the second direction.

2. The refrigeration appliance of claim 1, wherein the resisting force is less than the removal force applied by a user to remove the ice bin from the ice maker assembly.

3. The refrigeration appliance of claim 1, wherein the removal force is in the first direction.

4. The refrigeration appliance of claim 1, wherein the latch assembly in a latched orientation is disposed at a mating engagement of the ice maker housing and the ice bin.

5. The refrigeration appliance of claim 1, wherein the latch assembly extends along a front edge of the ice maker housing.

6. The refrigeration appliance of claim 5, wherein the front edge of the ice maker housing includes a front surface configured to abut against a rear-facing surface of the removable ice bin.

7. The refrigeration appliance of claim 1, wherein the latch assembly in its fully engaged state is disposed internal to the ice maker housing.

8. A refrigeration appliance, comprising:

a storage compartment for storing food items in a cooled environment;

an ice maker assembly disposed within the storage compartment for freezing water into ice pieces, the ice maker assembly comprising:

an ice maker housing having an internal cavity;

an ice bin for storing the ice pieces produced by an ice making apparatus, the ice bin being linearly removable from the internal cavity along a longitudinal central axis of the internal cavity; and a latch assembly configured to aid in retaining the ice bin in the ice maker housing, the latch assembly including a tang that is flexible at its base, and a linearly extending receiver configured to deflect the tang out of a latched orientation thereof, wherein upon linear insertion or removal of the ice bin relative to the internal cavity, the receiver is configured to transfer a respective linear pushing force or linear pulling force of a user acting on the ice bin into a deflection of a distal end of the tang over the receiver, to thereby cause respective coupling or decoupling of the latch assembly, wherein a pair of angled mating elements includes the tang and the receiver, wherein the tang includes a longitudinally extending arm and a distal snap extending from said arm, wherein at least one distal rib extends from said distal snap, wherein the receiver includes a pair of opposed receiver angled surfaces, including a receiver lead surface and a receiver engagement surface, with a receiver intermediate surface therebetween, wherein during assembly of the latch assembly into the ice bin, the at least one distal rib and the receiver lead surface are configured to engage one another first, and wherein the receiver further includes a resting surface adjacent to the receiver engagement surface, wherein the resting surface is configured to abut a tang intermediate surface that extends between a pair of opposed tang angled surfaces when the latch assembly is in a fully engaged orientation.

9. The refrigeration appliance of claim 8, wherein the latch assembly is decouplable absent the user engaging the latch assembly directly, or via an actuator thereof indirectly.

10. The refrigeration appliance of claim 8, wherein the pair of opposed tang angled surfaces extend transverse to one another and the pair of opposed receiver angled surfaces extend transverse to one another, and wherein each angled surface of the pair of opposed tang angled surfaces is arranged for contacting a corresponding angled surface of the pair of opposed receiver angled surfaces at some point.

11. The refrigeration appliance of claim 8, wherein the latch assembly includes a first pair of opposed first angled surfaces and a second pair of opposed second angled surfaces, and wherein each first angled surface of the first pair of opposed angled surfaces is arranged to slide against a corresponding second angled surface of the pair of opposed second angled surfaces during insertion or removal of the ice bin relative to the internal cavity.

12. The refrigeration appliance of claim 8, wherein the receiver at least partially defines an inner periphery of an opening of the ice maker housing directing the ice bin into the internal cavity.

13. The refrigeration appliance of claim 8, wherein the latch assembly includes only a single tang.

14. An ice maker arrangeable within a storage compartment of a refrigeration appliance, the ice maker for freezing water into ice pieces, and the ice maker, comprising:

an ice maker housing;

an ice making apparatus disposed within the ice maker housing and configured to make the ice pieces; and an ice bin selectively receivable into and removable from the ice maker housing in a horizontal direction, wherein one of the ice bin or the ice maker housing includes a longitudinally extending tang and the other of the ice bin and the ice maker includes a laterally extending receiver, wherein the tang and the receiver are selectively engageable with one another to restrict unintended withdrawal of the ice bin from the ice maker housing, wherein the tang includes a longitudinally extending arm and a distal snap extending from said arm, wherein at least one distal rib extends from said distal snap, wherein the receiver includes a pair of opposed receiver angled surfaces, including a receiver lead surface and a receiver engagement surface, with a receiver intermediate surface therebetween, wherein during assembly of the ice bin and the ice maker housing, the at least one distal rib and the receiver lead surface are configured to engage one another first, wherein the tang further includes a pair of opposed tang angled surfaces, wherein the pair of opposed tang angled surfaces extend transverse to one another and the pair of opposed receiver angled surfaces extend transverse to one another, wherein the tang angled surfaces and the receiver angled surfaces are jointly configured to enable both sliding engagement and sliding removal of the tang and the receiver relative to one another upon linear translation of the ice bin relative to the ice maker housing, and wherein the receiver further includes a resting surface adjacent to the receiver engagement surface, wherein the resting surface is configured to abut a tang intermediate surface that extends between the pair of opposed tang angled surfaces when the tang and the receiver are in a fully engaged orientation.

15. The ice maker of claim 14, wherein the pair of tang angled surfaces includes a tang lead surface and a tang engagement surface, wherein the tang lead surface and the receiver lead surface are arranged relative to one another such as to slide along one another during insertion of the ice bin into the ice maker housing, and wherein the tang engagement surface and the receiver engagement surface are arranged relative to one another such as to slide along one another during removal of the ice bin from the ice maker housing.

16. The ice maker of claim 15, wherein the tang lead surface has a lesser angle than the tang engagement surface relative to the horizontal direction, and wherein the receiver lead surface has a lesser angle than the receiver engagement surface relative to the horizontal direction.

17. The ice maker of claim 15, wherein one of the tang lead surface and the receiver lead surface has an angle relative to the horizontal direction in a range of 5 degrees to 60 degrees, and wherein the other of the tang lead surface and the receiver lead surface has an angle relative to the horizontal direction in a range of 0 degrees to 60 degrees.

18. The ice maker of claim 15, wherein one of the tang engagement surface and the receiver engagement surface has an angle relative to the horizontal direction in a range of 30 degrees to 90 degrees, and wherein the other of the tang engagement surface and the receiver engagement surface has an angle relative to the horizontal direction in a range of 90 degrees to 150 degrees.

19. The ice maker of claim 15, wherein the tang intermediate surface and the receiver intermediate surface are configured to engage one another during both insertion and removal, and wherein the tang lead surface and the receiver lead surface have a line of engagement whenever respectively engaged.

20. The ice maker of claim 14, wherein the tang extends along its length in a direction transverse to a direction of linear translation of the ice bin relative to the ice maker housing.

21. The ice maker of claim 14, wherein the receiver has an upper surface crossed by the tang during translation of the ice bin, the upper surface having a length dimension extending along a direction of insertion and removal of the ice bin and a width dimension extending orthogonal to the length dimension, wherein the width dimension is greater than the length dimension.

* * * * *